United States Patent
Hickman et al.

(10) Patent No.: US 10,580,025 B2
(45) Date of Patent: Mar. 3, 2020

(54) MICRO-GEOGRAPHIC AGGREGATION SYSTEM

(71) Applicant: Experian Information Solutions, Inc., Costa Mesa, CA (US)

(72) Inventors: Andrew John Hickman, Summit, NJ (US); Alan Tsang, San Diego, CA (US); Yaqi Tao, San Diego, CA (US); Shengjun Pan, Sunnyvale, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

(21) Appl. No.: 16/144,230

(22) Filed: Sep. 27, 2018

(65) Prior Publication Data

US 2019/0095939 A1    Mar. 28, 2019

Related U.S. Application Data

(63) Continuation of application No. 14/244,186, filed on Apr. 3, 2014, now Pat. No. 10,102,536.

(Continued)

(51) Int. Cl.
 *G06Q 30/02*      (2012.01)
(52) U.S. Cl.
 CPC ..... *G06Q 30/0205* (2013.01); *G06Q 30/0201* (2013.01)
(58) Field of Classification Search
 None
 See application file for complete search history.

(56) References Cited

U.S. PATENT DOCUMENTS 3,316,395 A   4/1967   Lavin et al.
4,163,290 A   7/1979   Sutherlin et al.
(Continued)

FOREIGN PATENT DOCUMENTS

CA    2 865 348    3/2015
CA    2 895 452    1/2016
(Continued)

OTHER PUBLICATIONS

Arno, Tina, "How to Find Out Who Has Lived in Your House Before You", https://web.archive.org/web/20130327090532/http://homeguides.sfgate.com/out-lived-house-before-50576.html as archived Mar. 27, 2013, pp. 2.

(Continued)

*Primary Examiner* — Mehmet Yesildag
(74) *Attorney, Agent, or Firm* — Knobbe, Martens, Olson & Bear, LLP

(57) ABSTRACT

The present disclosure describes systems and methods for automatically rolling-up data associated with one or more geographic units, such as ZIP+4 codes, such that the rollup comprises a minimum number of households to protect anonymity and ensure compliance with privacy regulations, while preserving variance of the underlying data associated with the geographic regions. Data attributes may include demographic data, socio-economic data, lifestyle segmentation, psychographic data, behavioral data, credit data, and other data. The rollup process may involve identifying one or more geographic units with a number of households below a minimum or threshold amount, applying filters to find candidate geographic units for rollup, scoring candidate geographic units to select best pairings for rollup, and repeating until the rollup group has at least the minimum number of households. The process may make trades off between granularity (e.g., number of households), proxim- (Continued)

ity, and similarity of data attributes associated with each geographic unit.

14 Claims, 9 Drawing Sheets

Related U.S. Application Data

(60) Provisional application No. 61/905,021, filed on Nov. 15, 2013.

(56) References Cited

U.S. PATENT DOCUMENTS

| | | | |
|---|---|---|---|
| 4,774,664 A | 9/1988 | Campbell et al. |
| 4,775,935 A | 10/1988 | Yourick |
| 4,827,508 A | 5/1989 | Shear |
| 4,868,570 A | 9/1989 | Davis |
| 4,872,113 A | 10/1989 | Dinerstein |
| 4,935,870 A | 6/1990 | Burk, Jr. et al. |
| 4,989,141 A | 1/1991 | Lyons et al. |
| 5,056,019 A | 10/1991 | Schultz et al. |
| 5,121,484 A | 6/1992 | Hirami et al. |
| 5,146,403 A | 9/1992 | Goodman |
| 5,201,010 A | 4/1993 | Deaton et al. |
| 5,216,612 A | 6/1993 | Cornett et al. |
| 5,247,575 A | 9/1993 | Sprague et al. |
| 5,274,547 A | 12/1993 | Zoffel et al. |
| 5,325,509 A | 6/1994 | Lautzenheiser |
| 5,341,429 A | 8/1994 | Stringer et al. |
| 5,454,030 A | 9/1995 | de Oliveira et al. |
| 5,504,675 A | 4/1996 | Cragun et al. |
| 5,528,701 A | 6/1996 | Aref |
| 5,555,409 A | 9/1996 | Leenstra, Sr. et al. |
| 5,563,783 A | 10/1996 | Stolfo et al. |
| 5,590,038 A | 12/1996 | Pitroda |
| 5,592,560 A | 1/1997 | Deaton et al. |
| 5,621,201 A | 4/1997 | Langhans et al. |
| 5,629,982 A | 5/1997 | Micali |
| 5,630,070 A | 5/1997 | Dietrich et al. |
| 5,640,551 A | 6/1997 | Chu et al. |
| 5,640,577 A | 6/1997 | Scharmer |
| 5,655,129 A | 8/1997 | Ito |
| 5,659,731 A | 8/1997 | Gustafson |
| 5,666,528 A | 9/1997 | Thai |
| 5,692,107 A | 11/1997 | Simoudis et al. |
| 5,696,907 A | 12/1997 | Tom |
| 5,703,783 A | 12/1997 | Allen et al. |
| 5,734,568 A | 3/1998 | Borgendale et al. |
| 5,737,732 A | 4/1998 | Gibson et al. |
| 5,739,512 A | 4/1998 | Tognazzini |
| 5,745,654 A | 4/1998 | Titan |
| 5,748,098 A | 5/1998 | Grace |
| 5,754,632 A | 5/1998 | Smith |
| 5,754,938 A | 5/1998 | Herz et al. |
| 5,754,939 A | 5/1998 | Herz et al. |
| 5,765,143 A | 6/1998 | Sheldon et al. |
| 5,768,423 A | 6/1998 | Aref et al. |
| 5,774,692 A | 6/1998 | Boyer et al. |
| 5,774,868 A | 6/1998 | Cragun et al. |
| 5,778,405 A | 7/1998 | Ogawa |
| 5,781,634 A | 7/1998 | Cordery et al. |
| 5,797,136 A | 8/1998 | Boyer et al. |
| 5,805,710 A | 9/1998 | Higgins et al. |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,828,837 A | 10/1998 | Eikland |
| 5,832,068 A | 11/1998 | Smith |
| 5,835,915 A | 11/1998 | Carr et al. |
| 5,842,185 A | 11/1998 | Chancey et al. |
| 5,844,218 A | 12/1998 | Kawan et al. |
| 5,848,396 A | 12/1998 | Gerace |
| 5,870,721 A | 2/1999 | Norris |
| 5,875,108 A | 2/1999 | Hoffberg et al. |
| 5,881,131 A | 3/1999 | Farris et al. |
| 5,884,287 A | 3/1999 | Edesess |
| 5,893,090 A | 4/1999 | Friedman et al. |
| 5,905,985 A | 5/1999 | Malloy et al. |
| 5,912,839 A | 6/1999 | Ovshinsky et al. |
| 5,915,243 A | 6/1999 | Smolen |
| 5,926,800 A | 7/1999 | Baronowski et al. |
| 5,944,787 A | 8/1999 | Zoken |
| 5,950,179 A | 9/1999 | Buchanan et al. |
| 5,956,693 A | 9/1999 | Geerlings |
| 5,961,593 A | 10/1999 | Gabber et al. |
| 5,963,932 A | 10/1999 | Jakobsson et al. |
| 5,966,695 A | 10/1999 | Melchione et al. |
| 5,974,396 A | 10/1999 | Anderson et al. |
| 5,978,780 A | 11/1999 | Watson |
| 6,009,415 A | 12/1999 | Shurling et al. |
| 6,014,688 A | 1/2000 | Venkatraman et al. |
| 6,018,723 A | 1/2000 | Siegel et al. |
| 6,026,368 A | 2/2000 | Brown et al. |
| 6,026,381 A | 2/2000 | Barton, III et al. |
| 6,029,139 A | 2/2000 | Cunningham et al. |
| 6,038,551 A | 3/2000 | Barlow et al. |
| 6,044,357 A | 3/2000 | Garg |
| 6,064,990 A | 5/2000 | Goldsmith |
| 6,070,147 A | 5/2000 | Harms et al. |
| 6,073,106 A | 6/2000 | Rozen et al. |
| 6,073,140 A | 6/2000 | Morgan et al. |
| 6,073,241 A | 6/2000 | Rosenberg et al. |
| 6,085,242 A | 7/2000 | Chandra |
| 6,098,052 A | 8/2000 | Kosiba et al. |
| 6,119,103 A | 9/2000 | Basch et al. |
| 6,121,901 A | 9/2000 | Welch et al. |
| 6,128,602 A | 10/2000 | Northington et al. |
| 6,128,624 A | 10/2000 | Papierniak et al. |
| 6,144,957 A | 11/2000 | Cohen et al. |
| 6,144,988 A | 11/2000 | Kappel |
| 6,151,601 A | 11/2000 | Papierniak et al. |
| 6,154,729 A | 11/2000 | Cannon et al. |
| 6,157,707 A | 12/2000 | Baulier et al. |
| 6,157,927 A | 12/2000 | Schaefer et al. |
| 6,161,139 A | 12/2000 | Win et al. |
| 6,178,442 B1 | 1/2001 | Yamazaki |
| 6,182,060 B1 | 1/2001 | Hedgcock et al. |
| 6,199,077 B1 | 3/2001 | Inala et al. |
| 6,202,053 B1 | 3/2001 | Christiansen et al. |
| 6,223,171 B1 | 4/2001 | Chaudhuri et al. |
| 6,233,588 B1 | 5/2001 | Marchoili et al. |
| 6,246,794 B1 | 6/2001 | Kagehiro et al. |
| 6,253,202 B1 | 6/2001 | Gilmour |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,266,649 B1 | 7/2001 | Linden et al. |
| 6,275,824 B1 | 8/2001 | O'Flaherty et al. |
| 6,304,860 B1 | 10/2001 | Martin et al. |
| 6,304,869 B1 | 10/2001 | Moore et al. |
| 6,311,169 B2 | 10/2001 | Duhon |
| 6,317,783 B1 | 11/2001 | Freishtat et al. |
| 6,330,546 B1 | 12/2001 | Gopinathan et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,397,197 B1 | 5/2002 | Gindlesperger |
| 6,405,173 B1 | 6/2002 | Honarvar |
| 6,405,245 B1 | 6/2002 | Burson et al. |
| 6,424,956 B1 | 7/2002 | Werbos |
| 6,430,539 B1 | 8/2002 | Lazarus et al. |
| 6,442,577 B1 | 8/2002 | Britton et al. |
| 6,446,200 B1 | 9/2002 | Ball et al. |
| 6,448,980 B1 | 9/2002 | Kumar et al. |
| 6,453,353 B1 | 9/2002 | Win et al. |
| 6,456,979 B1 | 9/2002 | Flagg |
| 6,457,012 B1 | 9/2002 | Jatkowski |
| 6,460,036 B1 | 10/2002 | Herz |
| 6,463,533 B1 | 10/2002 | Calamera et al. |
| 6,477,565 B1 | 11/2002 | Daswani et al. |

(56) References Cited

U.S. PATENT DOCUMENTS

| | | |
|---|---|---|
| 6,496,819 B1 | 12/2002 | Bello et al. |
| 6,496,931 B1 | 12/2002 | Rajchel et al. |
| 6,505,168 B1 | 1/2003 | Rothman et al. |
| 6,505,176 B2 | 1/2003 | DeFrancesco, Jr. et al. |
| 6,513,018 B1 | 1/2003 | Culhane |
| 6,517,587 B2 | 2/2003 | Satyavolu et al. |
| 6,523,021 B1 | 2/2003 | Monberg et al. |
| 6,523,022 B1 | 2/2003 | Hobbs |
| 6,523,041 B1 | 2/2003 | Morgan et al. |
| 6,532,450 B1 | 3/2003 | Brown et al. |
| 6,543,683 B2 | 4/2003 | Hoffman |
| 6,549,919 B2 | 4/2003 | Lambert et al. |
| 6,564,210 B1 | 5/2003 | Korda et al. |
| 6,567,850 B1 | 5/2003 | Freishtat et al. |
| 6,574,623 B1 | 6/2003 | Laung et al. |
| 6,574,736 B1 | 6/2003 | Andrews |
| 6,575,376 B2 | 6/2003 | Yu |
| 6,581,059 B1 | 6/2003 | Barrett et al. |
| 6,598,030 B1 | 7/2003 | Siegel et al. |
| 6,601,173 B1 | 7/2003 | Mohler |
| 6,601,234 B1 | 7/2003 | Bowman-Amuah |
| 6,615,247 B1 | 9/2003 | Murphy |
| 6,618,727 B1 | 9/2003 | Wheeler et al. |
| 6,622,266 B1 | 9/2003 | Goddard et al. |
| 6,623,529 B1 | 9/2003 | Lakritz |
| 6,631,496 B1 | 10/2003 | Li et al. |
| 6,633,910 B1 | 10/2003 | Rajan et al. |
| 6,647,383 B1 | 11/2003 | August et al. |
| 6,651,220 B1 | 11/2003 | Penteroudakis et al. |
| 6,658,393 B1 | 12/2003 | Basch et al. |
| 6,665,677 B1 | 12/2003 | Wotring et al. |
| 6,665,715 B1 | 12/2003 | Houri |
| 6,691,136 B2 | 2/2004 | Lee et al. |
| 6,708,166 B1 | 3/2004 | Dysart et al. |
| 6,714,944 B1 | 3/2004 | Shapiro et al. |
| 6,725,381 B1 | 4/2004 | Smith et al. |
| 6,725,425 B1 | 4/2004 | Rajan et al. |
| 6,738,748 B2 | 5/2004 | Wetzer |
| 6,738,759 B1 | 5/2004 | Wheeler et al. |
| 6,741,724 B1 | 5/2004 | Bruce et al. |
| 6,742,001 B2 | 5/2004 | Ripley |
| 6,748,426 B1 | 6/2004 | Shaffer et al. |
| 6,750,985 B2 | 6/2004 | Rhoads |
| 6,754,665 B1 | 6/2004 | Futagami et al. |
| 6,757,740 B1 | 6/2004 | Parekh et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,801,909 B2 | 10/2004 | Delgado et al. |
| 6,802,042 B2 | 10/2004 | Rangan et al. |
| 6,804,346 B1 | 10/2004 | Mewhinney |
| 6,804,701 B2 | 10/2004 | Muret et al. |
| 6,807,533 B1 | 10/2004 | Land et al. |
| 6,816,871 B2 | 11/2004 | Lee |
| 6,839,714 B2 | 1/2005 | Wheeler et al. |
| 6,845,448 B1 | 1/2005 | Chaganti et al. |
| 6,850,895 B2 | 2/2005 | Brodersen et al. |
| 6,853,997 B2 | 2/2005 | Wotring et al. |
| 6,865,680 B1 | 3/2005 | Wu et al. |
| 6,871,220 B1 | 3/2005 | Rajan et al. |
| 6,873,972 B1 | 3/2005 | Marcial et al. |
| 6,873,979 B2 | 3/2005 | Fishman et al. |
| 6,879,960 B2 | 4/2005 | Nascenzi et al. |
| 6,879,983 B2 | 4/2005 | Bellamy et al. |
| 6,910,624 B1 | 6/2005 | Natsuno |
| 6,915,269 B1 | 7/2005 | Shapiro et al. |
| 6,925,441 B1 | 8/2005 | Jones, III et al. |
| 6,928,487 B2 | 8/2005 | Eggebraaten et al. |
| 6,934,714 B2 | 8/2005 | Meinig |
| 6,947,984 B2 | 9/2005 | Schweitzer et al. |
| 6,947,989 B2 | 9/2005 | Gullotta et al. |
| 6,950,858 B2 | 9/2005 | Ogami |
| 6,954,757 B2 | 10/2005 | Zargham et al. |
| 6,970,830 B2 | 11/2005 | Samra et al. |
| 6,976,056 B1 | 12/2005 | Kumar |
| 6,983,379 B1 | 1/2006 | Spalink et al. |
| 6,983,478 B1 | 1/2006 | Grauch et al. |
| 6,985,882 B1 | 1/2006 | Del Sesto |
| 6,985,887 B1 | 1/2006 | Sunstein et al. |
| 6,985,898 B1 | 1/2006 | Ripley et al. |
| 6,988,085 B2 | 1/2006 | Hedy |
| 6,988,129 B2 | 1/2006 | Quine |
| 6,999,941 B1 | 2/2006 | Agarwal |
| 7,003,504 B1 | 2/2006 | Angus et al. |
| 7,003,792 B1 | 2/2006 | Yuen |
| 7,013,310 B2 | 3/2006 | Messing et al. |
| 7,016,907 B2 | 3/2006 | Boreham et al. |
| 7,028,001 B1 | 4/2006 | Muthuswamy et al. |
| 7,028,052 B2 | 4/2006 | Chapman et al. |
| 7,031,945 B1 | 4/2006 | Donner |
| 7,035,855 B1 | 4/2006 | Kilger et al. |
| 7,039,176 B2 | 5/2006 | Borodow et al. |
| 7,039,607 B2 | 5/2006 | Watarai et al. |
| 7,039,656 B1 | 5/2006 | Tsai et al. |
| 7,043,476 B2 | 5/2006 | Robson |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,054,828 B2 | 5/2006 | Heching et al. |
| 7,062,475 B1 | 6/2006 | Szabo et al. |
| 7,069,240 B2 | 6/2006 | Spero et al. |
| 7,072,963 B2 | 7/2006 | Anderson et al. |
| 7,075,894 B2 | 7/2006 | Hein et al. |
| 7,076,475 B2 | 7/2006 | Honarvar et al. |
| 7,082,435 B1 | 7/2006 | Guzman et al. |
| 7,085,997 B1 | 8/2006 | Wu et al. |
| 7,092,898 B1 | 8/2006 | Mattick et al. |
| 7,117,172 B1 | 10/2006 | Black |
| 7,124,144 B2 | 10/2006 | Christianson et al. |
| 7,133,935 B2 | 11/2006 | Hedy |
| 7,136,448 B1 | 11/2006 | Venkataperumal et al. |
| 7,139,734 B2 | 11/2006 | Nathans et al. |
| 7,155,739 B2 | 12/2006 | Bari et al. |
| 7,167,907 B2 | 1/2007 | Shaffer et al. |
| 7,178,096 B2 | 2/2007 | Rangan et al. |
| 7,184,974 B2 | 2/2007 | Shishido |
| 7,185,016 B1 | 2/2007 | Rasmussen |
| 7,188,107 B2 | 3/2007 | Moon et al. |
| 7,191,144 B2 | 3/2007 | White |
| 7,200,602 B2 | 4/2007 | Jonas |
| 7,206,768 B1 | 4/2007 | deGroeve et al. |
| 7,219,107 B2 | 5/2007 | Beringer |
| 7,222,101 B2 | 5/2007 | Bishop et al. |
| 7,222,369 B2 | 5/2007 | Vering et al. |
| 7,234,160 B2 | 6/2007 | Vogel et al. |
| 7,236,950 B2 | 6/2007 | Savage et al. |
| 7,240,059 B2 | 7/2007 | Bayliss et al. |
| 7,243,369 B2 | 7/2007 | Bhat et al. |
| 7,246,067 B2 | 7/2007 | Austin et al. |
| 7,249,048 B1 | 7/2007 | O'Flaherty |
| 7,263,548 B2 | 8/2007 | Daswani et al. |
| 7,272,591 B1 | 9/2007 | Ghazal et al. |
| 7,277,869 B2 | 10/2007 | Starkman |
| 7,277,900 B1 | 10/2007 | Ganesh et al. |
| 7,283,998 B2 | 10/2007 | Moon et al. |
| 7,296,734 B2 | 11/2007 | Pliha |
| 7,308,418 B2 | 12/2007 | Malek et al. |
| 7,313,538 B2 | 12/2007 | Wilmes et al. |
| 7,314,166 B2 | 1/2008 | Anderson et al. |
| 7,315,837 B2 | 1/2008 | Sloan et al. |
| 7,328,233 B2 | 2/2008 | Salim et al. |
| 7,340,679 B2 | 3/2008 | Botscheck et al. |
| 7,346,703 B2 | 3/2008 | Cope |
| 7,360,251 B2 | 4/2008 | Spalink et al. |
| 7,366,694 B2 | 4/2008 | Lazerson |
| 7,366,726 B2 | 4/2008 | Bellamy et al. |
| 7,367,011 B2 | 4/2008 | Ramsey et al. |
| 7,370,044 B2 | 5/2008 | Mulhern et al. |
| 7,373,335 B2 | 5/2008 | Cleghorn et al. |
| 7,376,603 B1 | 5/2008 | Mayr et al. |
| 7,376,714 B1 | 5/2008 | Gerken |
| 7,379,880 B1 | 5/2008 | Pathria et al. |
| 7,383,215 B1 | 6/2008 | Navarro et al. |
| 7,383,227 B2 | 6/2008 | Weinflash et al. |

(56) References Cited

U.S. PATENT DOCUMENTS

| | | |
|---|---|---|
| 7,383,988 B2 | 6/2008 | Slonecker, Jr. |
| 7,386,554 B2 | 6/2008 | Ripley et al. |
| 7,386,786 B2 | 6/2008 | Davis et al. |
| 7,389,305 B1 | 6/2008 | Kindig et al. |
| 7,392,216 B1 | 6/2008 | Palmgren et al. |
| 7,395,273 B2 | 7/2008 | Khan et al. |
| 7,398,225 B2 | 7/2008 | Voltmer et al. |
| 7,398,226 B2 | 7/2008 | Haines et al. |
| 7,403,923 B2 | 7/2008 | Elliott et al. |
| 7,403,942 B1 | 7/2008 | Bayliss |
| 7,421,322 B1 | 9/2008 | Silversmith et al. |
| 7,421,442 B2 | 9/2008 | Gelb et al. |
| 7,424,439 B1 | 9/2008 | Fayyad et al. |
| 7,424,520 B2 | 9/2008 | Daswani et al. |
| 7,428,498 B2 | 9/2008 | Voltmer et al. |
| 7,428,509 B2 | 9/2008 | Klebanoff |
| 7,433,864 B2 | 10/2008 | Malik |
| 7,451,113 B1 | 11/2008 | Kasower |
| 7,458,508 B1 | 12/2008 | Shao et al. |
| 7,460,857 B2 | 12/2008 | Roach, Jr. |
| 7,467,096 B2 | 12/2008 | Antonucci et al. |
| 7,467,127 B1 | 12/2008 | Baccash et al. |
| 7,467,401 B2 | 12/2008 | Cicchitto |
| 7,475,118 B2 | 1/2009 | Leiba et al. |
| 7,478,157 B2 | 1/2009 | Bohrer et al. |
| 7,483,842 B1 | 1/2009 | Fung et al. |
| 7,490,356 B2 | 2/2009 | Lieblich et al. |
| 7,496,524 B2 | 2/2009 | Voltmer et al. |
| 7,505,938 B2 | 3/2009 | Lang et al. |
| 7,529,698 B2 | 5/2009 | Joao |
| 7,533,179 B2 | 5/2009 | Tarquini et al. |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,543,739 B2 | 6/2009 | Brown et al. |
| 7,546,266 B2 | 6/2009 | Beirne et al. |
| 7,546,271 B1 | 6/2009 | Chmielewski et al. |
| 7,552,089 B2 | 6/2009 | Bruer et al. |
| 7,552,190 B1 | 6/2009 | Freishtat et al. |
| 7,556,192 B2 | 7/2009 | Wokaty, Jr. |
| 7,559,217 B2 | 7/2009 | Bass |
| 7,562,093 B2 | 7/2009 | Gelb et al. |
| 7,562,184 B2 | 7/2009 | Henmi et al. |
| 7,562,814 B1 | 7/2009 | Shao et al. |
| 7,571,473 B1 | 8/2009 | Boydstun et al. |
| 7,577,934 B2 | 8/2009 | Anonsen et al. |
| 7,584,126 B1 | 9/2009 | White |
| 7,584,146 B1 | 9/2009 | Duhon |
| 7,584,149 B1 | 9/2009 | Bishop et al. |
| 7,587,366 B2 | 9/2009 | Grim, III et al. |
| 7,593,889 B2 | 9/2009 | Raines et al. |
| 7,596,512 B1 | 9/2009 | Raines et al. |
| 7,596,716 B2 | 9/2009 | Frost et al. |
| 7,603,701 B2 | 10/2009 | Gaucas |
| 7,606,725 B2 | 10/2009 | Robertson et al. |
| 7,606,778 B2 | 10/2009 | Dewar |
| 7,610,243 B2 | 10/2009 | Haggerty et al. |
| 7,613,600 B2 | 11/2009 | Krane |
| 7,613,628 B2 | 11/2009 | Ariff et al. |
| 7,613,629 B2 | 11/2009 | Antonucci et al. |
| 7,613,671 B2 | 11/2009 | Serrano-Morales et al. |
| 7,634,737 B2 | 12/2009 | Beringer et al. |
| 7,640,200 B2 | 12/2009 | Gardner et al. |
| 7,647,344 B2 | 1/2010 | Skurtovich, Jr. et al. |
| 7,653,592 B1 | 1/2010 | Flaxman et al. |
| 7,653,593 B2 | 1/2010 | Zarikian et al. |
| 7,653,688 B2 | 1/2010 | Bittner |
| 7,657,540 B1 | 2/2010 | Bayliss |
| 7,668,725 B2 | 2/2010 | Alston |
| 7,668,769 B2 | 2/2010 | Baker et al. |
| 7,668,840 B2 | 2/2010 | Bayliss et al. |
| 7,672,833 B2 | 3/2010 | Blume et al. |
| 7,672,865 B2 | 3/2010 | Kumar et al. |
| 7,672,870 B2 | 3/2010 | Haines et al. |
| 7,672,879 B1 | 3/2010 | Kumar et al. |
| 7,672,924 B1 | 3/2010 | Scheurich et al. |
| 7,672,926 B2 | 3/2010 | Ghazal et al. |
| 7,676,410 B2 | 3/2010 | Petralia |
| 7,676,751 B2 | 3/2010 | Allen et al. |
| 7,685,209 B1 | 3/2010 | Norton et al. |
| 7,686,214 B1 | 3/2010 | Shao et al. |
| 7,689,494 B2 | 3/2010 | Torre et al. |
| 7,689,505 B2 | 3/2010 | Kasower |
| 7,689,526 B2 | 3/2010 | Byrnes et al. |
| 7,693,787 B2 | 4/2010 | Provinse |
| 7,698,163 B2 | 4/2010 | Reed et al. |
| 7,698,445 B2 | 4/2010 | Fitzpatrick et al. |
| 7,707,059 B2 | 4/2010 | Reed et al. |
| 7,707,102 B2 | 4/2010 | Rothstein |
| 7,707,164 B2 | 4/2010 | Kapochunas et al. |
| 7,707,271 B2 | 4/2010 | Rudkin et al. |
| 7,711,635 B2 | 5/2010 | Steele et al. |
| 7,711,636 B2 | 5/2010 | Robida et al. |
| 7,720,846 B1 | 5/2010 | Bayliss |
| 7,725,300 B2 | 5/2010 | Pinto et al. |
| 7,730,078 B2 | 6/2010 | Schwabe et al. |
| 7,734,523 B1 | 6/2010 | Cui et al. |
| 7,739,139 B2 | 6/2010 | Robertson et al. |
| 7,742,982 B2 | 6/2010 | Chaudhuri et al. |
| 7,743,043 B2 | 6/2010 | Winslow |
| 7,747,480 B1 | 6/2010 | Agresta et al. |
| 7,747,559 B2 | 6/2010 | Leitner et al. |
| 7,752,236 B2 | 7/2010 | Williams et al. |
| 7,752,535 B2 | 7/2010 | Satyavolu |
| 7,756,789 B2 | 7/2010 | Welker et al. |
| 7,761,379 B2 | 7/2010 | Zoldi et al. |
| 7,765,166 B2 | 7/2010 | Beringer et al. |
| 7,765,279 B1 | 7/2010 | Kaib et al. |
| 7,765,311 B2 | 7/2010 | Itabashi et al. |
| 7,769,696 B2 | 8/2010 | Yoda |
| 7,769,998 B2 | 8/2010 | Lynch et al. |
| 7,774,270 B1 | 8/2010 | MacCloskey |
| 7,783,515 B1 | 8/2010 | Kumar et al. |
| 7,783,562 B1 | 8/2010 | Ellis |
| 7,788,040 B2 | 8/2010 | Haskell et al. |
| 7,793,835 B1 | 9/2010 | Coggeshall et al. |
| 7,797,252 B2 | 9/2010 | Rosskamm et al. |
| 7,797,725 B2 | 9/2010 | Lunt et al. |
| 7,801,812 B2 | 9/2010 | Conlin et al. |
| 7,801,956 B1 | 9/2010 | Cumberbatch et al. |
| 7,805,345 B2 | 9/2010 | Abrahams et al. |
| 7,810,036 B2 | 10/2010 | Bales et al. |
| 7,813,955 B2 | 10/2010 | Ariff et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,818,231 B2 | 10/2010 | Rajan |
| 7,830,382 B2 | 11/2010 | Cirit et al. |
| 7,832,006 B2 | 11/2010 | Chen et al. |
| 7,836,111 B1 | 11/2010 | Shan |
| 7,841,008 B1 | 11/2010 | Cole et al. |
| 7,844,604 B2 | 11/2010 | Baio et al. |
| 7,848,972 B1 | 12/2010 | Sharma |
| 7,848,978 B2 | 12/2010 | Imrey et al. |
| 7,848,987 B2 | 12/2010 | Haig |
| 7,849,004 B2 | 12/2010 | Choudhuri et al. |
| 7,853,493 B2 | 12/2010 | DeBie et al. |
| 7,853,518 B2 | 12/2010 | Cagan |
| 7,853,998 B2 | 12/2010 | Blaisdell et al. |
| 7,856,386 B2 | 12/2010 | Hazlehurst et al. |
| 7,856,397 B2 | 12/2010 | Whipple et al. |
| 7,860,786 B2 | 12/2010 | Blackburn et al. |
| 7,870,151 B2 | 1/2011 | Mayer et al. |
| 7,877,304 B1 | 1/2011 | Coulter |
| 7,877,322 B2 | 1/2011 | Nathans et al. |
| 7,890,367 B2 | 2/2011 | Senghore et al. |
| 7,895,139 B2 | 2/2011 | Sullivan et al. |
| 7,899,750 B1 | 3/2011 | Klieman et al. |
| 7,904,366 B2 | 3/2011 | Pogust |
| 7,908,242 B1 | 3/2011 | Achanta |
| 7,912,842 B1 | 3/2011 | Bayliss et al. |
| 7,912,865 B2 | 3/2011 | Akerman et al. |
| 7,925,917 B1 | 4/2011 | Roy |
| 7,930,242 B2 | 4/2011 | Morris et al. |

(56) References Cited

U.S. PATENT DOCUMENTS

| | | |
|---|---|---|
| 7,945,516 B2 | 5/2011 | Bishop et al. |
| 7,954,698 B1 | 6/2011 | Pliha |
| 7,958,126 B2 | 6/2011 | Schachter |
| 7,970,701 B2 | 6/2011 | Lewis et al. |
| 7,974,860 B1 | 7/2011 | Travis |
| 7,975,299 B1 | 7/2011 | Balducci et al. |
| 7,983,932 B2 | 7/2011 | Kane |
| 7,983,976 B2 | 7/2011 | Nafeh et al. |
| 7,991,666 B2 | 8/2011 | Haggerty et al. |
| 7,991,688 B2 | 8/2011 | Phelan et al. |
| 7,991,689 B1 | 8/2011 | Brunzell et al. |
| 7,991,901 B2 | 8/2011 | Tarquini et al. |
| 7,996,320 B2 | 8/2011 | Bishop et al. |
| 7,996,521 B2 | 8/2011 | Chamberlain et al. |
| 7,996,912 B2 | 8/2011 | Spalink et al. |
| 8,001,042 B1 | 8/2011 | Brunzell et al. |
| 8,001,153 B2 | 8/2011 | Skurtovich, Jr. et al. |
| 8,001,235 B2 | 8/2011 | Russ et al. |
| 8,005,712 B2 | 8/2011 | von Davier et al. |
| 8,005,759 B2 | 8/2011 | Hirtenstein et al. |
| 8,006,261 B1 | 8/2011 | Haberman et al. |
| 8,019,843 B2 | 9/2011 | Cash et al. |
| 8,024,220 B2 | 9/2011 | Ariff et al. |
| 8,024,263 B2 | 9/2011 | Zarikian et al. |
| 8,024,264 B2 | 9/2011 | Chaudhuri et al. |
| 8,024,778 B2 | 9/2011 | Cash et al. |
| 8,036,979 B1 | 10/2011 | Torrez et al. |
| 8,050,968 B2 | 11/2011 | Antonucci et al. |
| 8,060,423 B1 | 11/2011 | Rukonic et al. |
| 8,060,424 B2 | 11/2011 | Kasower |
| 8,060,502 B2 | 11/2011 | Churi et al. |
| 8,064,586 B2 * | 11/2011 | Shaffer ............. G06Q 10/10 379/211.02 |
| 8,065,182 B2 | 11/2011 | Voltmer et al. |
| 8,065,233 B2 | 11/2011 | Lee et al. |
| 8,065,234 B2 | 11/2011 | Liao et al. |
| 8,065,264 B1 | 11/2011 | Achanta |
| 8,078,453 B2 | 12/2011 | Shaw |
| 8,078,528 B1 | 12/2011 | Vicente et al. |
| 8,082,202 B2 | 12/2011 | Weiss |
| 8,086,524 B1 | 12/2011 | Craig et al. |
| 8,095,443 B2 | 1/2012 | DeBie |
| 8,095,458 B2 | 1/2012 | Peterson et al. |
| 8,099,341 B2 | 1/2012 | Varghese |
| 8,099,356 B2 | 1/2012 | Feinstein et al. |
| 8,104,671 B2 | 1/2012 | Besecker et al. |
| 8,104,679 B2 | 1/2012 | Brown |
| 8,126,805 B2 | 2/2012 | Sulkowski et al. |
| 8,127,986 B1 | 3/2012 | Taylor et al. |
| 8,131,777 B2 | 3/2012 | McCullouch |
| 8,135,642 B1 | 3/2012 | Krause |
| 8,145,754 B2 | 3/2012 | Chamberlain et al. |
| 8,155,999 B2 | 4/2012 | de Boer et al. |
| 8,160,960 B1 | 4/2012 | Fei et al. |
| 8,161,104 B2 | 4/2012 | Tomkow |
| 8,175,889 B1 | 5/2012 | Girulat et al. |
| 8,180,654 B2 | 5/2012 | Berkman et al. |
| 8,190,629 B2 | 5/2012 | Wu et al. |
| 8,190,998 B2 | 5/2012 | Bitterlich |
| 8,195,550 B2 | 6/2012 | Haggerty et al. |
| 8,201,257 B1 | 6/2012 | Andres et al. |
| 8,204,774 B2 | 6/2012 | Chwast et al. |
| 8,214,238 B1 | 7/2012 | Fairfield et al. |
| 8,219,464 B2 | 7/2012 | Inghelbrecht et al. |
| 8,219,535 B1 * | 7/2012 | Kobori ............... G06Q 30/02 707/694 |
| 8,219,771 B2 | 7/2012 | Le Neel |
| 8,224,723 B2 | 7/2012 | Bosch et al. |
| 8,234,498 B2 | 7/2012 | Britti et al. |
| 8,239,130 B1 * | 8/2012 | Upstill ............. G01C 21/3679 701/400 |
| 8,244,635 B2 | 8/2012 | Freishtat et al. |
| 8,266,065 B2 | 9/2012 | Dilip et al. |
| 8,266,168 B2 | 9/2012 | Bayliss |
| 8,266,515 B2 | 9/2012 | Satyavolu |
| 8,271,378 B2 | 9/2012 | Chaudhuri et al. |
| 8,280,805 B1 | 10/2012 | Abrahams et al. |
| 8,281,180 B1 | 10/2012 | Roy |
| 8,285,656 B1 | 10/2012 | Chang et al. |
| 8,290,840 B2 | 10/2012 | Kasower |
| 8,296,213 B2 | 10/2012 | Haggerty et al. |
| 8,296,229 B1 | 10/2012 | Yellin et al. |
| 8,301,574 B2 | 10/2012 | Kilger et al. |
| 8,306,890 B2 | 11/2012 | Haggerty et al. |
| 8,306,986 B2 | 11/2012 | Routson et al. |
| 8,312,033 B1 | 11/2012 | McMillan |
| 8,315,933 B2 | 11/2012 | Haggerty et al. |
| 8,315,943 B2 | 11/2012 | Torrez et al. |
| 8,321,335 B1 | 11/2012 | Bramlage et al. |
| 8,321,339 B2 | 11/2012 | Imrey et al. |
| 8,321,952 B2 | 11/2012 | Spalink et al. |
| 8,326,672 B2 | 12/2012 | Haggerty et al. |
| 8,326,725 B2 | 12/2012 | Elwell et al. |
| 8,340,685 B2 * | 12/2012 | Cochran ............... H04W 4/029 455/456.1 |
| 8,341,073 B1 | 12/2012 | Bramlage et al. |
| 8,345,790 B2 | 1/2013 | Sartori et al. |
| 8,355,967 B2 | 1/2013 | Debie et al. |
| 8,359,210 B1 | 1/2013 | Altinger et al. |
| 8,364,518 B1 * | 1/2013 | Blake .................. G06Q 30/02 705/7.32 |
| 8,364,582 B2 | 1/2013 | Haggerty et al. |
| 8,364,588 B2 | 1/2013 | Celka et al. |
| 8,370,371 B1 | 2/2013 | Moncla et al. |
| 8,380,590 B1 | 2/2013 | Rukonic et al. |
| 8,386,377 B1 | 2/2013 | Xiong et al. |
| 8,392,334 B2 | 3/2013 | Hirtenstein et al. |
| 8,401,889 B2 | 3/2013 | Chwast et al. |
| 8,407,137 B2 | 3/2013 | Thomas |
| 8,417,612 B2 | 4/2013 | Chatterji et al. |
| 8,433,512 B1 * | 4/2013 | Lopatenko ......... G01C 21/3679 701/400 |
| 8,438,105 B2 | 5/2013 | Haggerty et al. |
| 8,458,026 B2 | 6/2013 | Voltmer et al. |
| 8,458,052 B2 | 6/2013 | Libman |
| 8,458,074 B2 | 6/2013 | Showalter |
| 8,463,919 B2 | 6/2013 | Tarquini et al. |
| 8,468,198 B2 | 6/2013 | Tomkow |
| 8,473,354 B2 * | 6/2013 | Psota .................. G06Q 10/083 705/26.1 |
| 8,473,380 B2 | 6/2013 | Thomas et al. |
| 8,478,674 B1 | 7/2013 | Kapczynski et al. |
| 8,484,211 B2 | 7/2013 | Bayliss |
| 8,489,482 B2 | 7/2013 | Haggerty et al. |
| 8,494,855 B1 | 7/2013 | Khosla et al. |
| 8,495,077 B2 | 7/2013 | Bayliss |
| 8,495,384 B1 | 7/2013 | DeLuccia |
| 8,498,930 B2 | 7/2013 | Chung et al. |
| 8,510,184 B2 | 8/2013 | Imrey et al. |
| 8,510,189 B2 | 8/2013 | Imrey et al. |
| 8,515,828 B1 | 8/2013 | Wolf et al. |
| 8,515,862 B2 | 8/2013 | Zhang et al. |
| 8,521,628 B1 | 8/2013 | Gowen et al. |
| 8,521,729 B2 | 8/2013 | Churi et al. |
| 8,533,322 B2 | 9/2013 | Chamberlain et al. |
| 8,549,472 B1 | 10/2013 | Tilwani |
| 8,560,434 B2 | 10/2013 | Morris et al. |
| 8,560,436 B2 | 10/2013 | Ingram et al. |
| 8,566,029 B1 * | 10/2013 | Lopatenko ........... G08G 1/0962 701/426 |
| 8,566,141 B1 | 10/2013 | Nagdev et al. |
| 8,566,167 B2 | 10/2013 | Munjal |
| 8,572,083 B1 | 10/2013 | Snell et al. |
| 8,583,593 B1 | 11/2013 | Achanta |
| 8,589,069 B1 * | 11/2013 | Lehman ............... G01C 21/20 340/995.1 |
| 8,589,208 B2 * | 11/2013 | Kruger ............... G06Q 30/0205 705/7.29 |
| 8,600,854 B2 | 12/2013 | Mayr et al. |
| 8,606,632 B2 | 12/2013 | Libman |
| 8,606,666 B1 | 12/2013 | Courbage et al. |
| 8,620,579 B1 * | 12/2013 | Upstill ............. G01C 21/3679 701/400 |

(56) References Cited

U.S. PATENT DOCUMENTS

| | | | |
|---|---|---|---|
| 8,626,560 B1 | 1/2014 | Anderson | |
| 8,626,582 B2 | 1/2014 | Ariff et al. | |
| 8,626,618 B2* | 1/2014 | Psota | G06Q 30/02 |
| | | | 705/26.9 |
| 8,626,646 B2 | 1/2014 | Torrez et al. | |
| 8,630,929 B2 | 1/2014 | Haggerty et al. | |
| 8,639,568 B2 | 1/2014 | de Boer et al. | |
| 8,639,616 B1 | 1/2014 | Rolenaitis et al. | |
| 8,639,920 B2 | 1/2014 | Stack et al. | |
| 8,666,885 B1 | 3/2014 | Bramlage et al. | |
| 8,671,115 B2 | 3/2014 | Skurtovich, Jr. et al. | |
| 8,677,129 B2 | 3/2014 | Milana et al. | |
| 8,682,770 B2 | 3/2014 | Haggerty et al. | |
| 8,694,390 B2 | 4/2014 | Imrey et al. | |
| 8,694,403 B2 | 4/2014 | Haggerty et al. | |
| 8,705,718 B2 | 4/2014 | Baniak et al. | |
| 8,706,474 B2 | 4/2014 | Blume et al. | |
| 8,719,114 B2 | 5/2014 | Libman | |
| 8,725,613 B1 | 5/2014 | Celka et al. | |
| 8,732,004 B1 | 5/2014 | Ramos et al. | |
| 8,732,013 B2 | 5/2014 | Senghore et al. | |
| 8,732,073 B2 | 5/2014 | Thomas | |
| 8,738,435 B2 | 5/2014 | Libman | |
| 8,738,515 B2 | 5/2014 | Chaudhuri et al. | |
| 8,738,516 B1 | 5/2014 | Dean et al. | |
| 8,738,532 B2 | 5/2014 | Ariff et al. | |
| 8,744,944 B2 | 6/2014 | Haggerty et al. | |
| 8,762,053 B1* | 6/2014 | Lehman | G01C 21/20 |
| | | | 340/995.1 |
| 8,768,826 B2 | 7/2014 | Imrey et al. | |
| 8,768,914 B2 | 7/2014 | Scriffignano et al. | |
| 8,775,290 B2 | 7/2014 | Haggerty et al. | |
| 8,775,299 B2 | 7/2014 | Achanta et al. | |
| 8,775,301 B2 | 7/2014 | Haggerty et al. | |
| 8,781,877 B2* | 7/2014 | Kruger | G06Q 30/0205 |
| | | | 705/7.35 |
| 8,781,882 B1 | 7/2014 | Arboletti et al. | |
| 8,781,933 B2 | 7/2014 | Haggerty et al. | |
| 8,781,951 B2 | 7/2014 | Lewis et al. | |
| 8,781,953 B2 | 7/2014 | Kasower | |
| 8,782,217 B1 | 7/2014 | Arone et al. | |
| 8,788,388 B2 | 7/2014 | Chatterji et al. | |
| 8,788,701 B1 | 7/2014 | Byrnes et al. | |
| 8,805,805 B1* | 8/2014 | Kobori | G06Q 30/02 |
| | | | 707/694 |
| 8,818,888 B1 | 8/2014 | Kapczynski et al. | |
| 8,825,544 B2 | 9/2014 | Imrey et al. | |
| 8,843,780 B1 | 9/2014 | Roy | |
| 8,862,566 B2 | 10/2014 | Leitner et al. | |
| 8,930,251 B2 | 1/2015 | DeBie | |
| 8,938,432 B2* | 1/2015 | Rossmark | G06Q 10/00 |
| | | | 707/700 |
| 8,949,981 B1 | 2/2015 | Trollope et al. | |
| 8,954,459 B1 | 2/2015 | McMillan et al. | |
| 8,966,649 B2 | 2/2015 | Stack et al. | |
| 8,972,400 B1 | 3/2015 | Kapczynski et al. | |
| 9,026,088 B1 | 5/2015 | Groenjes | |
| 9,057,616 B1* | 6/2015 | Lopatenko | G08G 1/0962 |
| 9,057,617 B1* | 6/2015 | Lopatenko | G08G 1/0962 |
| 9,058,340 B1 | 6/2015 | Chamberlain et al. | |
| 9,063,226 B2 | 6/2015 | Zheng et al. | |
| 9,075,848 B2 | 7/2015 | Churi et al. | |
| 9,116,918 B1 | 8/2015 | Kim | |
| 9,143,541 B1* | 9/2015 | Szamonek | H04L 65/403 |
| 9,147,042 B1 | 9/2015 | Haller et al. | |
| 9,147,152 B2 | 9/2015 | Nack et al. | |
| 9,152,727 B1 | 10/2015 | Balducci et al. | |
| 9,165,044 B2 | 10/2015 | Psenka et al. | |
| 9,213,646 B1 | 12/2015 | LaPanse et al. | |
| 9,251,541 B2 | 2/2016 | Celka et al. | |
| 9,256,624 B2 | 2/2016 | Skurtovich, Jr. et al. | |
| 9,256,866 B2 | 2/2016 | Pontious | |
| 9,268,803 B2 | 2/2016 | Kapochunas et al. | |
| 9,305,300 B2 | 4/2016 | Mulhern et al. | |
| 9,318,105 B1 | 4/2016 | Khosla | |
| 9,324,087 B2 | 4/2016 | Routson et al. | |
| 9,329,715 B2 | 5/2016 | Schwarz et al. | |
| 9,342,783 B1 | 5/2016 | Chang et al. | |
| 9,438,570 B2 | 9/2016 | Milana et al. | |
| 9,483,606 B1 | 11/2016 | Dean et al. | |
| 9,489,614 B2 | 11/2016 | Nack et al. | |
| 9,529,851 B1 | 12/2016 | Smith | |
| 9,535,959 B2 | 1/2017 | Sun et al. | |
| 9,553,936 B2* | 1/2017 | Dijk | H04L 67/20 |
| 9,576,030 B1 | 2/2017 | Kapczynski et al. | |
| 9,595,051 B2 | 3/2017 | Stack et al. | |
| 9,646,058 B2 | 5/2017 | Churi et al. | |
| 9,684,905 B1 | 6/2017 | Haller et al. | |
| 9,704,192 B2 | 7/2017 | Ainsworth et al. | |
| 9,710,523 B2 | 7/2017 | Skurtovich, Jr. et al. | |
| 9,710,841 B2 | 7/2017 | Ainsworth, III et al. | |
| 9,774,681 B2 | 9/2017 | Zoldi et al. | |
| 9,842,345 B2 | 12/2017 | Ariff et al. | |
| 9,866,561 B2 | 1/2018 | Psenka et al. | |
| 10,019,508 B1 | 7/2018 | Kapczynski | |
| 10,075,446 B2 | 9/2018 | McMillan et al. | |
| 10,102,536 B1 | 10/2018 | Hickman et al. | |
| 10,115,102 B2 | 10/2018 | Burrell et al. | |
| 10,140,193 B1 | 11/2018 | Roy | |
| 10,180,861 B2 | 1/2019 | Raghavan et al. | |
| 10,242,019 B1 | 3/2019 | Shan et al. | |
| 10,262,362 B1 | 4/2019 | Hu et al. | |
| 10,367,888 B2 | 7/2019 | Zoldi et al. | |
| 10,380,619 B2 | 8/2019 | Pontious | |
| 2001/0000536 A1 | 4/2001 | Tarin | |
| 2001/0011245 A1 | 8/2001 | Duhon | |
| 2001/0014868 A1 | 8/2001 | Herz et al. | |
| 2001/0014878 A1 | 8/2001 | Mitra et al. | |
| 2001/0029470 A1 | 10/2001 | Schultz et al. | |
| 2001/0029482 A1 | 10/2001 | Tealdi et al. | |
| 2001/0034631 A1 | 10/2001 | Kiselik | |
| 2001/0037332 A1 | 11/2001 | Miller et al. | |
| 2001/0039523 A1 | 11/2001 | Iwamoto | |
| 2001/0039532 A1 | 11/2001 | Coleman, Jr. et al. | |
| 2001/0049274 A1 | 12/2001 | Degraeve | |
| 2001/0049620 A1 | 12/2001 | Blasko | |
| 2002/0004736 A1 | 1/2002 | Roundtree et al. | |
| 2002/0010664 A1 | 1/2002 | Rabideau et al. | |
| 2002/0010701 A1 | 1/2002 | Kosciuszko | |
| 2002/0013827 A1 | 1/2002 | Edstrom et al. | |
| 2002/0026411 A1 | 2/2002 | Nathans et al. | |
| 2002/0026507 A1 | 2/2002 | Sears et al. | |
| 2002/0026519 A1 | 2/2002 | Itabashi et al. | |
| 2002/0029162 A1 | 3/2002 | Mascarenhas | |
| 2002/0033846 A1 | 3/2002 | Balasubramanian et al. | |
| 2002/0035684 A1 | 3/2002 | Vogel et al. | |
| 2002/0049701 A1 | 4/2002 | Nabe et al. | |
| 2002/0049738 A1 | 4/2002 | Epstein | |
| 2002/0052841 A1 | 5/2002 | Guthrie et al. | |
| 2002/0052884 A1 | 5/2002 | Farber et al. | |
| 2002/0055869 A1 | 5/2002 | Hegg | |
| 2002/0059142 A1 | 5/2002 | Krause et al. | |
| 2002/0069122 A1 | 6/2002 | Yun et al. | |
| 2002/0077964 A1 | 6/2002 | Brody et al. | |
| 2002/0091650 A1 | 7/2002 | Ellis | |
| 2002/0091706 A1 | 7/2002 | Anderson et al. | |
| 2002/0099628 A1 | 7/2002 | Takaoka et al. | |
| 2002/0099824 A1 | 7/2002 | Bender et al. | |
| 2002/0099936 A1 | 7/2002 | Kou et al. | |
| 2002/0103809 A1 | 8/2002 | Starzl et al. | |
| 2002/0103933 A1 | 8/2002 | Garon et al. | |
| 2002/0111816 A1 | 8/2002 | Lortscher et al. | |
| 2002/0111910 A1 | 8/2002 | Walsh | |
| 2002/0119824 A1 | 8/2002 | Allen | |
| 2002/0120504 A1 | 8/2002 | Gould et al. | |
| 2002/0120757 A1 | 8/2002 | Sutherland et al. | |
| 2002/0123928 A1 | 9/2002 | Eldering et al. | |
| 2002/0128962 A1 | 9/2002 | Kasower | |
| 2002/0129368 A1 | 9/2002 | Schlack et al. | |
| 2002/0131565 A1 | 9/2002 | Scheuring et al. | |
| 2002/0133504 A1 | 9/2002 | Vlahos et al. | |
| 2002/0138297 A1 | 9/2002 | Lee | |
| 2002/0138331 A1 | 9/2002 | Hosea et al. | |

(56) References Cited

U.S. PATENT DOCUMENTS

| | | |
|---|---|---|
| 2002/0138333 A1 | 9/2002 | DeCotiis et al. |
| 2002/0138334 A1 | 9/2002 | DeCotiis et al. |
| 2002/0138417 A1 | 9/2002 | Lawrence |
| 2002/0138470 A1 | 9/2002 | Zhou |
| 2002/0143943 A1 | 10/2002 | Lee et al. |
| 2002/0147695 A1 | 10/2002 | Khedkar et al. |
| 2002/0147801 A1 | 10/2002 | Gullotta et al. |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0173994 A1 | 11/2002 | Ferguson, III |
| 2002/0184255 A1 | 12/2002 | Edd et al. |
| 2002/0188544 A1 | 12/2002 | Wizon et al. |
| 2002/0194103 A1 | 12/2002 | Nabe |
| 2002/0198800 A1 | 12/2002 | Shamrakov |
| 2002/0198824 A1 | 12/2002 | Cook |
| 2003/0002671 A1 | 1/2003 | Inchalik et al. |
| 2003/0009418 A1 | 1/2003 | Green et al. |
| 2003/0018549 A1 | 1/2003 | Fei et al. |
| 2003/0018578 A1 | 1/2003 | Schultz |
| 2003/0018769 A1 | 1/2003 | Foulger et al. |
| 2003/0023489 A1 | 1/2003 | McGuire et al. |
| 2003/0023531 A1 | 1/2003 | Fergusson |
| 2003/0041031 A1 | 2/2003 | Hedy |
| 2003/0041050 A1 | 2/2003 | Smith et al. |
| 2003/0046311 A1 | 3/2003 | Baidya et al. |
| 2003/0050882 A1 | 3/2003 | Degen et al. |
| 2003/0055931 A1 | 3/2003 | Cravo De Almeida et al. |
| 2003/0060284 A1 | 3/2003 | Hamalainen et al. |
| 2003/0061233 A1 | 3/2003 | Manasse et al. |
| 2003/0069839 A1 | 4/2003 | Whittington et al. |
| 2003/0069943 A1 | 4/2003 | Bahrs et al. |
| 2003/0078877 A1 | 4/2003 | Beirne et al. |
| 2003/0093289 A1 | 5/2003 | Thornley et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105728 A1 | 6/2003 | Yano et al. |
| 2003/0105733 A1 | 6/2003 | Boreham |
| 2003/0105742 A1 | 6/2003 | Boreham et al. |
| 2003/0110111 A1 | 6/2003 | Nalebuff et al. |
| 2003/0110293 A1 | 6/2003 | Friedman et al. |
| 2003/0120591 A1 | 6/2003 | Birkhead et al. |
| 2003/0135451 A1 | 7/2003 | O'Brien et al. |
| 2003/0153299 A1 | 8/2003 | Perfit et al. |
| 2003/0158749 A1 | 8/2003 | Olchanski et al. |
| 2003/0158776 A1 | 8/2003 | Landesmann |
| 2003/0163416 A1 | 8/2003 | Kitajima |
| 2003/0163513 A1 | 8/2003 | Schaeck et al. |
| 2003/0163708 A1 | 8/2003 | Tang |
| 2003/0171942 A1 | 9/2003 | Gaito |
| 2003/0182018 A1 | 9/2003 | Snapp |
| 2003/0191731 A1 | 10/2003 | Stewart et al. |
| 2003/0200151 A1 | 10/2003 | Ellenson et al. |
| 2003/0204429 A1 | 10/2003 | Botscheck et al. |
| 2003/0208362 A1 | 11/2003 | Enthoven et al. |
| 2003/0212600 A1 | 11/2003 | Hood, III et al. |
| 2003/0212654 A1 | 11/2003 | Harper et al. |
| 2003/0219709 A1 | 11/2003 | Olenick et al. |
| 2003/0225742 A1 | 12/2003 | Tenner et al. |
| 2003/0229892 A1 | 12/2003 | Sardera |
| 2003/0233278 A1 | 12/2003 | Marshall |
| 2003/0233655 A1 | 12/2003 | Gutta et al. |
| 2004/0006488 A1 | 1/2004 | Fitall et al. |
| 2004/0006536 A1 | 1/2004 | Kawashima et al. |
| 2004/0010443 A1 | 1/2004 | May et al. |
| 2004/0010458 A1 | 1/2004 | Friedman |
| 2004/0019799 A1 | 1/2004 | Vering et al. |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0044673 A1 | 3/2004 | Brady et al. |
| 2004/0052357 A1 | 3/2004 | Logan et al. |
| 2004/0059626 A1 | 3/2004 | Smallwood |
| 2004/0062213 A1 | 4/2004 | Koss |
| 2004/0078324 A1 | 4/2004 | Lonnberg et al. |
| 2004/0083215 A1 | 4/2004 | de Jong |
| 2004/0088237 A1 | 5/2004 | Moenickheim et al. |
| 2004/0088255 A1 | 5/2004 | Zielke et al. |
| 2004/0098625 A1 | 5/2004 | Lagadec et al. |
| 2004/0102197 A1 | 5/2004 | Dietz |
| 2004/0103147 A1 | 5/2004 | Flesher et al. |
| 2004/0107250 A1 | 6/2004 | Marciano |
| 2004/0111305 A1 | 6/2004 | Gavan et al. |
| 2004/0111359 A1 | 6/2004 | Hudock |
| 2004/0117235 A1 | 6/2004 | Shacham |
| 2004/0117358 A1 | 6/2004 | Von Kaenel et al. |
| 2004/0122696 A1 | 6/2004 | Beringer |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128156 A1 | 7/2004 | Beringer et al. |
| 2004/0128227 A1 | 7/2004 | Whipple et al. |
| 2004/0128230 A1 | 7/2004 | Oppenheimer et al. |
| 2004/0128236 A1 | 7/2004 | Brown et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0139025 A1 | 7/2004 | Coleman |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153330 A1 | 8/2004 | Miller et al. |
| 2004/0153448 A1 | 8/2004 | Cheng et al. |
| 2004/0153521 A1 | 8/2004 | Kogo |
| 2004/0158520 A1 | 8/2004 | Noh |
| 2004/0158523 A1 | 8/2004 | Dort |
| 2004/0176995 A1 | 9/2004 | Fusz |
| 2004/0186807 A1 | 9/2004 | Nathans et al. |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0199789 A1 | 10/2004 | Shaw et al. |
| 2004/0204948 A1 | 10/2004 | Singletary et al. |
| 2004/0205157 A1 | 10/2004 | Bibelnieks et al. |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0221043 A1 | 11/2004 | Su et al. |
| 2004/0225099 A1 | 11/2004 | Hohberg et al. |
| 2004/0225545 A1 | 11/2004 | Turner et al. |
| 2004/0225594 A1 | 11/2004 | Nolan, III et al. |
| 2004/0225596 A1 | 11/2004 | Kemper et al. |
| 2004/0225643 A1 | 11/2004 | Alpha et al. |
| 2004/0230534 A1 | 11/2004 | McGough |
| 2004/0230820 A1 | 11/2004 | Hui Hsu et al. |
| 2004/0243588 A1 | 12/2004 | Tanner et al. |
| 2004/0254935 A1 | 12/2004 | Chagoly et al. |
| 2004/0261116 A1 | 12/2004 | Mckeown et al. |
| 2004/0267714 A1 | 12/2004 | Frid et al. |
| 2005/0004805 A1 | 1/2005 | Srinivasan |
| 2005/0005168 A1 | 1/2005 | Dick |
| 2005/0010513 A1 | 1/2005 | Duckworth et al. |
| 2005/0010555 A1 | 1/2005 | Gallivan |
| 2005/0021397 A1 | 1/2005 | Cui et al. |
| 2005/0021856 A1 | 1/2005 | Basile et al. |
| 2005/0027633 A1 | 2/2005 | Fortuna et al. |
| 2005/0027995 A1 | 2/2005 | Menschik et al. |
| 2005/0038726 A1 | 2/2005 | Salomon et al. |
| 2005/0038737 A1 | 2/2005 | Norris |
| 2005/0049991 A1 | 3/2005 | Aggarwal |
| 2005/0050027 A1 | 3/2005 | Yeh et al. |
| 2005/0055231 A1 | 3/2005 | Lee |
| 2005/0060332 A1 | 3/2005 | Bernstein et al. |
| 2005/0071328 A1 | 3/2005 | Lawrence |
| 2005/0086261 A1 | 4/2005 | Mammone |
| 2005/0091164 A1 | 4/2005 | Varble |
| 2005/0097039 A1 | 5/2005 | Kulcsar et al. |

(56) References Cited

U.S. PATENT DOCUMENTS

| | | |
|---|---|---|
| 2005/0102180 A1 | 5/2005 | Gailey et al. |
| 2005/0102206 A1 | 5/2005 | Savasoglu et al. |
| 2005/0108396 A1 | 5/2005 | Bittner |
| 2005/0108631 A1 | 5/2005 | Amorin et al. |
| 2005/0113991 A1 | 5/2005 | Rogers et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0120249 A1 | 6/2005 | Shuster |
| 2005/0137899 A1 | 6/2005 | Davies et al. |
| 2005/0137963 A1 | 6/2005 | Ricketts et al. |
| 2005/0144452 A1 | 6/2005 | Lynch et al. |
| 2005/0144641 A1 | 6/2005 | Lewis |
| 2005/0154664 A1 | 7/2005 | Guy et al. |
| 2005/0154769 A1 | 7/2005 | Eckart et al. |
| 2005/0187948 A1 | 8/2005 | Monitzer et al. |
| 2005/0189414 A1 | 9/2005 | Fano et al. |
| 2005/0192008 A1 | 9/2005 | Desai et al. |
| 2005/0197953 A1 | 9/2005 | Broadbent et al. |
| 2005/0197954 A1 | 9/2005 | Maitland et al. |
| 2005/0201272 A1 | 9/2005 | Wang et al. |
| 2005/0208461 A1 | 9/2005 | Krebs et al. |
| 2005/0209892 A1 | 9/2005 | Miller |
| 2005/0209922 A1 | 9/2005 | Hofmeister |
| 2005/0222900 A1 | 10/2005 | Fuloria et al. |
| 2005/0226224 A1 | 10/2005 | Lee et al. |
| 2005/0240468 A1 | 10/2005 | Inman et al. |
| 2005/0246256 A1 | 11/2005 | Gastineau et al. |
| 2005/0246338 A1 | 11/2005 | Bird |
| 2005/0251408 A1 | 11/2005 | Swaminathan et al. |
| 2005/0251474 A1 | 11/2005 | Shinn et al. |
| 2005/0256780 A1 | 11/2005 | Eldred |
| 2005/0257250 A1 | 11/2005 | Mitchell et al. |
| 2005/0262158 A1 | 11/2005 | Sauermann |
| 2005/0267774 A1 | 12/2005 | Merritt et al. |
| 2005/0267821 A1 | 12/2005 | Anderson |
| 2005/0273849 A1 | 12/2005 | Araujo et al. |
| 2005/0278246 A1 | 12/2005 | Friedman et al. |
| 2005/0279827 A1 | 12/2005 | Mascavage et al. |
| 2005/0288954 A1 | 12/2005 | McCarthy et al. |
| 2005/0288998 A1 | 12/2005 | Verma et al. |
| 2005/0289003 A1 | 12/2005 | Thompson et al. |
| 2006/0004626 A1 | 1/2006 | Holmen et al. |
| 2006/0004753 A1 | 1/2006 | Coifman et al. |
| 2006/0014129 A1 | 1/2006 | Coleman et al. |
| 2006/0015425 A1 | 1/2006 | Brooks |
| 2006/0020611 A1 | 1/2006 | Gilbert et al. |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041443 A1 | 2/2006 | Horvath |
| 2006/0041670 A1 | 2/2006 | Musseleck et al. |
| 2006/0059073 A1 | 3/2006 | Walzak |
| 2006/0069635 A1 | 3/2006 | Ram et al. |
| 2006/0074991 A1 | 4/2006 | Lussier et al. |
| 2006/0079211 A1 | 4/2006 | Degraeve |
| 2006/0080233 A1 | 4/2006 | Mendelovich et al. |
| 2006/0080251 A1 | 4/2006 | Fried et al. |
| 2006/0085334 A1 | 4/2006 | Murphy |
| 2006/0085361 A1 | 4/2006 | Hoerle et al. |
| 2006/0085454 A1 | 4/2006 | Blegen et al. |
| 2006/0089842 A1 | 4/2006 | Medawar |
| 2006/0122921 A1 | 6/2006 | Comerford et al. |
| 2006/0129419 A1 | 6/2006 | Flaxer et al. |
| 2006/0129428 A1 | 6/2006 | Wennberg |
| 2006/0136330 A1 | 6/2006 | DeRoy et al. |
| 2006/0136595 A1 | 6/2006 | Satyavolu |
| 2006/0144927 A1 | 7/2006 | Love et al. |
| 2006/0149674 A1 | 7/2006 | Cook et al. |
| 2006/0155573 A1 | 7/2006 | Hartunian |
| 2006/0155780 A1 | 7/2006 | Sakairi et al. |
| 2006/0161554 A1 | 7/2006 | Lucovsky et al. |
| 2006/0177226 A1 | 8/2006 | Ellis, III |
| 2006/0178189 A1 | 8/2006 | Walker et al. |
| 2006/0178971 A1 | 8/2006 | Owen et al. |
| 2006/0179050 A1 | 8/2006 | Giang et al. |
| 2006/0184440 A1 | 8/2006 | Britti et al. |
| 2006/0184585 A1 | 8/2006 | Grear et al. |
| 2006/0195688 A1 | 8/2006 | Drissi et al. |
| 2006/0202012 A1 | 9/2006 | Grano et al. |
| 2006/0212350 A1 | 9/2006 | Ellis et al. |
| 2006/0229961 A1 | 10/2006 | Lyftogt et al. |
| 2006/0235935 A1 | 10/2006 | Ng |
| 2006/0241923 A1 | 10/2006 | Xu et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242050 A1 | 10/2006 | Haggerty et al. |
| 2006/0267999 A1 | 11/2006 | Cash et al. |
| 2006/0271457 A1 | 11/2006 | Romain et al. |
| 2006/0271472 A1 | 11/2006 | Cagan |
| 2006/0276171 A1 | 12/2006 | Pousti |
| 2006/0277089 A1 | 12/2006 | Hubbard et al. |
| 2006/0277092 A1 | 12/2006 | Williams |
| 2006/0277102 A1 | 12/2006 | Agliozzo |
| 2006/0277141 A1 | 12/2006 | Palmer |
| 2006/0282328 A1 | 12/2006 | Gerace et al. |
| 2006/0282359 A1 | 12/2006 | Nobili et al. |
| 2006/0282429 A1 | 12/2006 | Hernandez-Sherrington et al. |
| 2006/0282819 A1 | 12/2006 | Graham et al. |
| 2006/0288090 A1 | 12/2006 | Kraft |
| 2006/0293921 A1 | 12/2006 | McCarthy et al. |
| 2006/0293932 A1 | 12/2006 | Cash et al. |
| 2006/0293979 A1 | 12/2006 | Cash et al. |
| 2006/0294199 A1 | 12/2006 | Bertholf |
| 2007/0011020 A1 | 1/2007 | Martin |
| 2007/0011039 A1 | 1/2007 | Oddo |
| 2007/0011083 A1 | 1/2007 | Bird et al. |
| 2007/0011099 A1 | 1/2007 | Sheehan |
| 2007/0016500 A1 | 1/2007 | Chatterji et al. |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0030282 A1 | 2/2007 | Cash et al. |
| 2007/0033227 A1 | 2/2007 | Gaito et al. |
| 2007/0038483 A1 | 2/2007 | Wood |
| 2007/0038497 A1 | 2/2007 | Britti et al. |
| 2007/0043654 A1 | 2/2007 | Libman |
| 2007/0047714 A1 | 3/2007 | Baniak et al. |
| 2007/0055618 A1 | 3/2007 | Pogust |
| 2007/0055621 A1 | 3/2007 | Tischler et al. |
| 2007/0061195 A1 | 3/2007 | Liu et al. |
| 2007/0061243 A1 | 3/2007 | Ramer et al. |
| 2007/0067207 A1 | 3/2007 | Haggerty et al. |
| 2007/0067235 A1 | 3/2007 | Nathans et al. |
| 2007/0067285 A1 | 3/2007 | Blume et al. |
| 2007/0067297 A1 | 3/2007 | Kublickis |
| 2007/0067437 A1 | 3/2007 | Sindambiwe |
| 2007/0083460 A1 | 4/2007 | Bachenheimer |
| 2007/0094137 A1 | 4/2007 | Phillips et al. |
| 2007/0094230 A1 | 4/2007 | Subramaniam et al. |
| 2007/0094241 A1 | 4/2007 | M. Blackwell et al. |
| 2007/0094264 A1 | 4/2007 | Nair |
| 2007/0106582 A1 | 5/2007 | Baker et al. |
| 2007/0112579 A1 | 5/2007 | Ratnakaran et al. |
| 2007/0112668 A1 | 5/2007 | Celano et al. |
| 2007/0118393 A1 | 5/2007 | Rosen et al. |
| 2007/0121843 A1 | 5/2007 | Atazky et al. |
| 2007/0124235 A1 | 5/2007 | Chakraborty et al. |
| 2007/0127702 A1* | 6/2007 | Shaffer ............... G06Q 10/10 379/355.04 |
| 2007/0130070 A1 | 6/2007 | Williams |
| 2007/0156515 A1 | 7/2007 | Hasselback et al. |
| 2007/0156554 A1 | 7/2007 | Nikoley et al. |
| 2007/0156589 A1 | 7/2007 | Zimler et al. |
| 2007/0168246 A1 | 7/2007 | Haggerty et al. |
| 2007/0179860 A1 | 8/2007 | Romero |
| 2007/0185797 A1 | 8/2007 | Robinson |
| 2007/0192347 A1* | 8/2007 | Rossmark ............... G06Q 10/00 |
| 2007/0204338 A1 | 8/2007 | Aiello et al. |
| 2007/0208640 A1 | 9/2007 | Banasiak et al. |
| 2007/0208729 A1 | 9/2007 | Martino |
| 2007/0214000 A1 | 9/2007 | Shahrabi et al. |
| 2007/0220611 A1 | 9/2007 | Socolow et al. |

(56) References Cited

U.S. PATENT DOCUMENTS

| | | |
|---|---|---|
| 2007/0226010 A1 | 9/2007 | Larsen |
| 2007/0226093 A1 | 9/2007 | Chan et al. |
| 2007/0226129 A1 | 9/2007 | Liao et al. |
| 2007/0244782 A1 | 10/2007 | Chimento |
| 2007/0250327 A1 | 10/2007 | Hedy |
| 2007/0250441 A1 | 10/2007 | Paulsen et al. |
| 2007/0250459 A1 | 10/2007 | Schwarz et al. |
| 2007/0261114 A1 | 11/2007 | Pomerantsev |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288360 A1 | 12/2007 | Seeklus |
| 2007/0299759 A1 | 12/2007 | Kelly |
| 2008/0004957 A1 | 1/2008 | Hildreth et al. |
| 2008/0005313 A1 | 1/2008 | Flake et al. |
| 2008/0010206 A1 | 1/2008 | Coleman |
| 2008/0015938 A1 | 1/2008 | Haddad et al. |
| 2008/0021804 A1 | 1/2008 | Deckoff |
| 2008/0027858 A1 | 1/2008 | Benson |
| 2008/0027859 A1 | 1/2008 | Nathans et al. |
| 2008/0028067 A1 | 1/2008 | Berkhin et al. |
| 2008/0033742 A1 | 2/2008 | Bernasconi |
| 2008/0033750 A1 | 2/2008 | Burriss et al. |
| 2008/0033956 A1 | 2/2008 | Saha et al. |
| 2008/0052182 A1 | 2/2008 | Marshall |
| 2008/0052244 A1 | 2/2008 | Tsuei et al. |
| 2008/0059224 A1 | 3/2008 | Schechter |
| 2008/0059317 A1 | 3/2008 | Chandran et al. |
| 2008/0059364 A1 | 3/2008 | Tidwell et al. |
| 2008/0059449 A1 | 3/2008 | Webster et al. |
| 2008/0065774 A1 | 3/2008 | Keeler |
| 2008/0072316 A1 | 3/2008 | Chang et al. |
| 2008/0082536 A1 | 4/2008 | Schwabe et al. |
| 2008/0086368 A1 | 4/2008 | Bauman et al. |
| 2008/0097768 A1 | 4/2008 | Godshalk |
| 2008/0103972 A1 | 5/2008 | Lanc |
| 2008/0109875 A1 | 5/2008 | Kraft |
| 2008/0110973 A1 | 5/2008 | Nathans et al. |
| 2008/0115191 A1 | 5/2008 | Kim et al. |
| 2008/0120155 A1 | 5/2008 | Pliha |
| 2008/0120569 A1 | 5/2008 | Mann et al. |
| 2008/0133273 A1 | 6/2008 | Marshall |
| 2008/0133325 A1 | 6/2008 | De et al. |
| 2008/0134042 A1 | 6/2008 | Jankovich |
| 2008/0140476 A1 | 6/2008 | Anand et al. |
| 2008/0140576 A1 | 6/2008 | Lewis et al. |
| 2008/0147523 A1 | 6/2008 | Mulry et al. |
| 2008/0167956 A1 | 7/2008 | Keithley |
| 2008/0172324 A1 | 7/2008 | Johnson |
| 2008/0177655 A1 | 7/2008 | Zalik |
| 2008/0177836 A1 | 7/2008 | Bennett |
| 2008/0183504 A1 | 7/2008 | Highley |
| 2008/0183564 A1 | 7/2008 | Tien et al. |
| 2008/0184270 A1 | 7/2008 | Cole et al. |
| 2008/0195548 A1 | 8/2008 | Chu et al. |
| 2008/0195600 A1 | 8/2008 | Deakter |
| 2008/0201401 A1 | 8/2008 | Pugh et al. |
| 2008/0205655 A1 | 8/2008 | Wilkins et al. |
| 2008/0205774 A1 | 8/2008 | Brinker et al. |
| 2008/0208548 A1 | 8/2008 | Metzger et al. |
| 2008/0208610 A1 | 8/2008 | Thomas et al. |
| 2008/0208631 A1 | 8/2008 | Morita et al. |
| 2008/0208735 A1 | 8/2008 | Balet et al. |
| 2008/0208873 A1 | 8/2008 | Boehmer |
| 2008/0215470 A1 | 9/2008 | Sengupta et al. |
| 2008/0216156 A1 | 9/2008 | Kosaka |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221990 A1 | 9/2008 | Megdal et al. |
| 2008/0222027 A1 | 9/2008 | Megdal et al. |
| 2008/0228540 A1 | 9/2008 | Megdal et al. |
| 2008/0228556 A1 | 9/2008 | Megdal et al. |
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0244008 A1 | 10/2008 | Wilkinson et al. |
| 2008/0249869 A1 | 10/2008 | Angell et al. |
| 2008/0255897 A1 | 10/2008 | Megdal et al. |
| 2008/0255975 A1 | 10/2008 | Chaudhuri et al. |
| 2008/0262925 A1 | 10/2008 | Kim et al. |
| 2008/0263058 A1 | 10/2008 | Peden |
| 2008/0263638 A1 | 10/2008 | McMurtry et al. |
| 2008/0270209 A1 | 10/2008 | Mauseth et al. |
| 2008/0270245 A1 | 10/2008 | Boukadoum et al. |
| 2008/0270294 A1 | 10/2008 | Lent et al. |
| 2008/0288283 A1 | 11/2008 | Baldwin, Jr. et al. |
| 2008/0294540 A1 | 11/2008 | Celka et al. |
| 2008/0300977 A1 | 12/2008 | Gerakos et al. |
| 2008/0301016 A1 | 12/2008 | Durvasula et al. |
| 2008/0301188 A1 | 12/2008 | O'Hara |
| 2008/0306750 A1 | 12/2008 | Wunder et al. |
| 2008/0312963 A1 | 12/2008 | Reiner |
| 2008/0312969 A1 | 12/2008 | Raines et al. |
| 2008/0319889 A1 | 12/2008 | Hammad |
| 2008/0320575 A1 | 12/2008 | Gelb et al. |
| 2009/0006185 A1 | 1/2009 | Stinson |
| 2009/0006475 A1 | 1/2009 | Udezue et al. |
| 2009/0012889 A1 | 1/2009 | Finch |
| 2009/0018986 A1 | 1/2009 | Alcorn et al. |
| 2009/0018996 A1 | 1/2009 | Hunt et al. |
| 2009/0019027 A1 | 1/2009 | Ju et al. |
| 2009/0024428 A1 | 1/2009 | Hudock, Jr. |
| 2009/0024505 A1 | 1/2009 | Patel et al. |
| 2009/0030776 A1 | 1/2009 | Walker et al. |
| 2009/0031426 A1 | 1/2009 | Dal Lago et al. |
| 2009/0043637 A1 | 2/2009 | Eder |
| 2009/0043691 A1 | 2/2009 | Kasower |
| 2009/0048877 A1 | 2/2009 | Binns et al. |
| 2009/0055894 A1 | 2/2009 | Lorsch |
| 2009/0060343 A1 | 3/2009 | Rosca |
| 2009/0076883 A1 | 3/2009 | Kilger et al. |
| 2009/0089190 A1 | 4/2009 | Girulat |
| 2009/0089205 A1 | 4/2009 | Bayne |
| 2009/0094064 A1 | 4/2009 | Tyler et al. |
| 2009/0094237 A1 | 4/2009 | Churi et al. |
| 2009/0094674 A1 | 4/2009 | Schwartz et al. |
| 2009/0094675 A1 | 4/2009 | Powers |
| 2009/0099914 A1 | 4/2009 | Lang et al. |
| 2009/0106846 A1 | 4/2009 | Dupray et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0132347 A1 | 5/2009 | Anderson et al. |
| 2009/0138335 A1 | 5/2009 | Lieberman |
| 2009/0144102 A1 | 6/2009 | Lopez |
| 2009/0144201 A1 | 6/2009 | Gierkink et al. |
| 2009/0150166 A1 | 6/2009 | Leite et al. |
| 2009/0150238 A1 | 6/2009 | Marsh et al. |
| 2009/0164232 A1 | 6/2009 | Chmielewski et al. |
| 2009/0164380 A1 | 6/2009 | Brown |
| 2009/0172815 A1 | 7/2009 | Gu et al. |
| 2009/0183259 A1 | 7/2009 | Rinek et al. |
| 2009/0198557 A1 | 8/2009 | Wang et al. |
| 2009/0198602 A1 | 8/2009 | Wang et al. |
| 2009/0198612 A1 | 8/2009 | Meimes et al. |
| 2009/0210807 A1 | 8/2009 | Xiao et al. |
| 2009/0210886 A1 | 8/2009 | Bhojwani et al. |
| 2009/0215479 A1 | 8/2009 | Karmarkar |
| 2009/0216591 A1 | 8/2009 | Buerger et al. |
| 2009/0216640 A1 | 8/2009 | Masi |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0222449 A1 | 9/2009 | Hom et al. |
| 2009/0228918 A1 | 9/2009 | Rolff et al. |
| 2009/0234665 A1 | 9/2009 | Conkel |

(56) References Cited

U.S. PATENT DOCUMENTS

| | | |
|---|---|---|
| 2009/0234775 A1 | 9/2009 | Whitney et al. |
| 2009/0234876 A1 | 9/2009 | Schigel et al. |
| 2009/0240609 A1 | 9/2009 | Cho et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0249440 A1 | 10/2009 | Platt et al. |
| 2009/0254375 A1 | 10/2009 | Martinez et al. |
| 2009/0254656 A1 | 10/2009 | Vignisson et al. |
| 2009/0254971 A1 | 10/2009 | Herz et al. |
| 2009/0265326 A1 | 10/2009 | Lehrman et al. |
| 2009/0271248 A1 | 10/2009 | Sherman et al. |
| 2009/0271265 A1 | 10/2009 | Lay et al. |
| 2009/0276233 A1 | 11/2009 | Brimhall et al. |
| 2009/0276368 A1 | 11/2009 | Martin et al. |
| 2009/0300066 A1 | 12/2009 | Guo et al. |
| 2009/0313049 A1 | 12/2009 | Joao et al. |
| 2009/0313163 A1 | 12/2009 | Wang et al. |
| 2009/0313562 A1 | 12/2009 | Appleyard et al. |
| 2009/0319648 A1 | 12/2009 | Dutta et al. |
| 2009/0327120 A1 | 12/2009 | Eze et al. |
| 2009/0328173 A1 | 12/2009 | Jakobson et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0030578 A1 | 2/2010 | Siddique et al. |
| 2010/0030677 A1 | 2/2010 | Melik-Aslanian et al. |
| 2010/0037299 A1 | 2/2010 | Karasick et al. |
| 2010/0042583 A1 | 2/2010 | Gervais |
| 2010/0049651 A1 | 2/2010 | Lang et al. |
| 2010/0049803 A1 | 2/2010 | Ogilvie et al. |
| 2010/0094704 A1 | 4/2010 | Subramanian et al. |
| 2010/0094758 A1 | 4/2010 | Chamberlain et al. |
| 2010/0094774 A1 | 4/2010 | Jackowitz et al. |
| 2010/0114646 A1 | 5/2010 | McIlwain et al. |
| 2010/0114724 A1 | 5/2010 | Ghosh et al. |
| 2010/0142698 A1 | 6/2010 | Spottiswoode et al. |
| 2010/0145836 A1 | 6/2010 | Baker et al. |
| 2010/0145840 A1 | 6/2010 | Kasower |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0185546 A1 | 7/2010 | Pollard |
| 2010/0188684 A1 | 7/2010 | Kumara |
| 2010/0198629 A1 | 8/2010 | Wesileder et al. |
| 2010/0205076 A1 | 8/2010 | Parson et al. |
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0228657 A1 | 9/2010 | Kagarlis |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250434 A1 | 9/2010 | Megdal et al. |
| 2010/0250497 A1 | 9/2010 | Redlich et al. |
| 2010/0250509 A1 | 9/2010 | Andersen |
| 2010/0268557 A1 | 10/2010 | Faith et al. |
| 2010/0268660 A1 | 10/2010 | Ekdahl |
| 2010/0293090 A1 | 11/2010 | Domenikos et al. |
| 2010/0293114 A1 | 11/2010 | Khan et al. |
| 2010/0332292 A1 | 12/2010 | Anderson |
| 2011/0009707 A1 | 1/2011 | Kaundinya et al. |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0047071 A1 | 2/2011 | Choudhuri et al. |
| 2011/0054981 A1* | 3/2011 | Faith ............... G06Q 30/02 705/7.36 |
| 2011/0066495 A1 | 3/2011 | Ayloo et al. |
| 2011/0071950 A1 | 3/2011 | Ivanovic |
| 2011/0076663 A1 | 3/2011 | Krallman et al. |
| 2011/0078073 A1 | 3/2011 | Annappindi et al. |
| 2011/0093383 A1 | 4/2011 | Haggerty et al. |
| 2011/0112958 A1 | 5/2011 | Haggerty et al. |
| 2011/0113084 A1 | 5/2011 | Ramnani |
| 2011/0113086 A1 | 5/2011 | Long et al. |
| 2011/0125595 A1 | 5/2011 | Neal et al. |
| 2011/0126275 A1 | 5/2011 | Anderson et al. |
| 2011/0131131 A1 | 6/2011 | Griffin et al. |
| 2011/0137760 A1 | 6/2011 | Rudie et al. |
| 2011/0137789 A1 | 6/2011 | Kortina et al. |
| 2011/0142213 A1 | 6/2011 | Baniak et al. |
| 2011/0145122 A1 | 6/2011 | Haggerty et al. |
| 2011/0161218 A1 | 6/2011 | Swift |
| 2011/0161323 A1 | 6/2011 | Hagiwara |
| 2011/0164746 A1 | 7/2011 | Nice et al. |
| 2011/0166988 A1 | 7/2011 | Coulter |
| 2011/0173116 A1 | 7/2011 | Yan et al. |
| 2011/0178899 A1 | 7/2011 | Huszar |
| 2011/0178922 A1 | 7/2011 | Imrey et al. |
| 2011/0179139 A1 | 7/2011 | Starkenburg et al. |
| 2011/0184838 A1 | 7/2011 | Winters et al. |
| 2011/0196791 A1 | 8/2011 | Dominguez |
| 2011/0202474 A1 | 8/2011 | Mele et al. |
| 2011/0211445 A1 | 9/2011 | Chen |
| 2011/0218826 A1 | 9/2011 | Birtel et al. |
| 2011/0219421 A1 | 9/2011 | Ullman et al. |
| 2011/0238566 A1 | 9/2011 | Santos |
| 2011/0251946 A1 | 10/2011 | Haggerty et al. |
| 2011/0258050 A1 | 10/2011 | Chan et al. |
| 2011/0264566 A1 | 10/2011 | Brown |
| 2011/0270779 A1 | 11/2011 | Showalter |
| 2011/0276396 A1 | 11/2011 | Rathod |
| 2011/0307397 A1 | 12/2011 | Benmbarek |
| 2011/0320307 A1 | 12/2011 | Mehta et al. |
| 2012/0011056 A1 | 1/2012 | Ward et al. |
| 2012/0011158 A1 | 1/2012 | Avner et al. |
| 2012/0016948 A1 | 1/2012 | Sinha |
| 2012/0017266 A1 | 1/2012 | DiChiara et al. |
| 2012/0029956 A1 | 2/2012 | Ghosh et al. |
| 2012/0029996 A1 | 2/2012 | Lang et al. |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054592 A1 | 3/2012 | Jaffe et al. |
| 2012/0066065 A1* | 3/2012 | Switzer ............... G06Q 20/10 705/14.53 |
| 2012/0066084 A1 | 3/2012 | Sneyders |
| 2012/0072464 A1 | 3/2012 | Cohen |
| 2012/0101939 A1 | 4/2012 | Kasower |
| 2012/0106801 A1 | 5/2012 | Jackson |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0143921 A1 | 6/2012 | Wilson |
| 2012/0150587 A1* | 6/2012 | Kruger ............... G06Q 30/0205 705/7.34 |
| 2012/0158460 A1* | 6/2012 | Kruger ............... G06Q 30/0205 705/7.34 |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0179536 A1 | 7/2012 | Kalb et al. |
| 2012/0198556 A1 | 8/2012 | Patel et al. |
| 2012/0209586 A1 | 8/2012 | Mieritz et al. |
| 2012/0215682 A1 | 8/2012 | Lent et al. |
| 2012/0216125 A1 | 8/2012 | Pierce |
| 2012/0226916 A1 | 9/2012 | Hahn et al. |
| 2012/0232958 A1* | 9/2012 | Silbert ............... G06Q 30/02 705/7.34 |
| 2012/0239497 A1 | 9/2012 | Nuzzi |
| 2012/0239515 A1 | 9/2012 | Batra et al. |
| 2012/0265607 A1 | 10/2012 | Belwadi |
| 2012/0284118 A1* | 11/2012 | Mamich, Jr. ....... G06Q 30/0261 705/14.52 |
| 2012/0290660 A1 | 11/2012 | Rao et al. |
| 2012/0317016 A1 | 12/2012 | Hughes |

(56) References Cited

U.S. PATENT DOCUMENTS

| | | |
|---|---|---|
| 2012/0323954 A1 | 12/2012 | Bonalle et al. |
| 2013/0018811 A1 | 1/2013 | Britti et al. |
| 2013/0031109 A1 | 1/2013 | Roulson et al. |
| 2013/0031624 A1 | 1/2013 | Britti et al. |
| 2013/0080242 A1 | 3/2013 | Alhadeff et al. |
| 2013/0080467 A1 | 3/2013 | Carson et al. |
| 2013/0085804 A1 | 4/2013 | Leff et al. |
| 2013/0085902 A1 | 4/2013 | Chew |
| 2013/0117832 A1 | 5/2013 | Gandhi |
| 2013/0124263 A1* | 5/2013 | Amaro ............ G06Q 30/02 705/7.34 |
| 2013/0125010 A1 | 5/2013 | Strandell |
| 2013/0132151 A1 | 5/2013 | Stibel et al. |
| 2013/0137464 A1 | 5/2013 | Kramer et al. |
| 2013/0151388 A1 | 6/2013 | Falkenborg et al. |
| 2013/0159168 A1 | 6/2013 | Evans |
| 2013/0159411 A1 | 6/2013 | Bowen |
| 2013/0173481 A1 | 7/2013 | Hirtenstein et al. |
| 2013/0185293 A1 | 7/2013 | Boback |
| 2013/0211986 A1 | 8/2013 | Debie et al. |
| 2013/0218638 A1 | 8/2013 | Kilger et al. |
| 2013/0226783 A1 | 8/2013 | Haggerty et al. |
| 2013/0226787 A1 | 8/2013 | Haggerty et al. |
| 2013/0226820 A1 | 8/2013 | Sedota, Jr. et al. |
| 2013/0238413 A1 | 9/2013 | Carlson et al. |
| 2013/0268357 A1 | 10/2013 | Heath |
| 2013/0279676 A1 | 10/2013 | Baniak et al. |
| 2013/0293363 A1 | 11/2013 | Plymouth |
| 2013/0332338 A1 | 12/2013 | Yan et al. |
| 2013/0332342 A1 | 12/2013 | Kasower |
| 2013/0347059 A1 | 12/2013 | Fong et al. |
| 2014/0025562 A1 | 1/2014 | Rothrock et al. |
| 2014/0032265 A1 | 1/2014 | Paprocki et al. |
| 2014/0032300 A1 | 1/2014 | Zhang et al. |
| 2014/0040182 A1 | 2/2014 | Gilder et al. |
| 2014/0046887 A1 | 2/2014 | Lessin |
| 2014/0095251 A1 | 4/2014 | Huovilainen |
| 2014/0279197 A1 | 9/2014 | Ainsworth, III et al. |
| 2014/0316969 A1 | 10/2014 | Imrey |
| 2015/0066772 A1 | 3/2015 | Griffin et al. |
| 2015/0095184 A1 | 4/2015 | Ainsworth et al. |
| 2015/0095187 A1 | 4/2015 | Ainsworth et al. |
| 2015/0108227 A1 | 4/2015 | Nack et al. |
| 2015/0235230 A1 | 8/2015 | Ainsworth, III et al. |
| 2015/0248661 A1 | 9/2015 | Pontious |
| 2015/0248665 A1 | 9/2015 | Walz |
| 2015/0248691 A1 | 9/2015 | Pontious |
| 2015/0248716 A1 | 9/2015 | Ainsworth, III et al. |
| 2015/0262109 A1 | 9/2015 | Ainsworth, III et al. |
| 2015/0262291 A1 | 9/2015 | West et al. |
| 2015/0278225 A1 | 10/2015 | Weiss et al. |
| 2015/0295906 A1 | 10/2015 | Ufford et al. |
| 2015/0332414 A1 | 11/2015 | Unser |
| 2016/0004728 A1 | 1/2016 | Balet et al. |
| 2016/0005114 A1 | 1/2016 | Donovan et al. |
| 2016/0048700 A1 | 2/2016 | Stransky-Heilkron |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2016/0098775 A1 | 4/2016 | Ainsworth, III et al. |
| 2016/0098776 A1 | 4/2016 | Ainsworth, III et al. |
| 2016/0098784 A1 | 4/2016 | Ainsworth, III et al. |
| 2016/0110694 A1 | 4/2016 | Walz et al. |
| 2016/0110707 A1 | 4/2016 | Nack et al. |
| 2016/0140639 A1 | 5/2016 | Ainsworth, III et al. |
| 2016/0155160 A1 | 6/2016 | Walz et al. |
| 2016/0155191 A1 | 6/2016 | Walz et al. |
| 2016/0171542 A1 | 6/2016 | Fanous et al. |
| 2016/0180258 A1 | 6/2016 | Walz |
| 2016/0180349 A1 | 6/2016 | Korra et al. |
| 2016/0183051 A1 | 6/2016 | Nack et al. |
| 2016/0189152 A1 | 6/2016 | Walz |
| 2016/0189192 A1 | 6/2016 | Walz |
| 2016/0210224 A1 | 7/2016 | Cohen et al. |
| 2016/0267485 A1 | 9/2016 | Walz et al. |
| 2016/0267508 A1 | 9/2016 | West |
| 2016/0267513 A1 | 9/2016 | Walz et al. |
| 2016/0267514 A1 | 9/2016 | Walz et al. |
| 2016/0267515 A1 | 9/2016 | Walz et al. |
| 2016/0267516 A1 | 9/2016 | Walz et al. |
| 2016/0342999 A1 | 11/2016 | Rouston et al. |
| 2016/0350851 A1 | 12/2016 | Ainsworth, III et al. |
| 2017/0039588 A1 | 2/2017 | Koltnow et al. |
| 2017/0039616 A1 | 2/2017 | Korra et al. |
| 2017/0061511 A1 | 3/2017 | Korra et al. |
| 2017/0061532 A1 | 3/2017 | Koltnow et al. |
| 2017/0161780 A1 | 6/2017 | Michalek |
| 2017/0177809 A1 | 6/2017 | Bull et al. |
| 2017/0186297 A1 | 6/2017 | Brenner |
| 2017/0193315 A1 | 7/2017 | El-Khamy et al. |
| 2018/0053172 A1 | 2/2018 | Nack et al. |
| 2018/0053252 A1 | 2/2018 | Koltnow et al. |
| 2018/0060546 A1 | 3/2018 | Yin |
| 2018/0089379 A1 | 3/2018 | Collins et al. |
| 2018/0101889 A1 | 4/2018 | Nack et al. |
| 2018/0150599 A1 | 5/2018 | Valdes et al. |
| 2018/0218069 A1 | 8/2018 | Rege et al. |
| 2018/0308151 A1 | 10/2018 | Ainsworth, III et al. |
| 2018/0330383 A1 | 11/2018 | Pontious et al. |
| 2018/0330415 A1 | 11/2018 | Billman et al. |
| 2018/0343265 A1 | 11/2018 | McMillan et al. |
| 2019/0005498 A1 | 1/2019 | Roca et al. |
| 2019/0026354 A1 | 1/2019 | Kapczynski |
| 2019/0043126 A1 | 2/2019 | Billman et al. |

FOREIGN PATENT DOCUMENTS

| | | |
|---|---|---|
| CA | 2 901 057 | 4/2016 |
| CA | 2 909 392 | 6/2016 |
| CA | 2 915 375 | 6/2016 |
| CA | 2 923 334 | 9/2016 |
| KR | 10-2013-0107394 | 10/2013 |
| TW | 256569 | 6/2006 |
| WO | WO 94/006103 | 3/1994 |
| WO | WO 95/034155 | 12/1995 |
| WO | WO 96/000945 | 1/1996 |
| WO | WO 97/023838 | 7/1997 |
| WO | WO 98/041931 | 9/1998 |
| WO | WO 98/041932 | 9/1998 |
| WO | WO 98/041933 | 9/1998 |
| WO | WO 98/049643 | 11/1998 |
| WO | WO 99/017225 | 4/1999 |
| WO | WO 99/017226 | 4/1999 |
| WO | WO 99/022328 | 5/1999 |
| WO | WO 99/038094 | 7/1999 |
| WO | WO 00/004465 | 1/2000 |
| WO | WO 00/028441 | 5/2000 |
| WO | WO 00/055778 | 9/2000 |
| WO | WO 00/055789 | 9/2000 |
| WO | WO 00/055790 | 9/2000 |
| WO | WO 00/065469 | 11/2000 |
| WO | WO 01/009752 | 2/2001 |
| WO | WO 01/009792 | 2/2001 |
| WO | WO 01/010090 | 2/2001 |
| WO | WO 01/011522 | 2/2001 |
| WO | WO 01/084281 | 11/2001 |
| WO | WO 2004/031986 | 4/2004 |
| WO | WO 2004/051436 | 6/2004 |
| WO | WO 2004/088464 | 10/2004 |
| WO | WO 2004/114160 | 12/2004 |
| WO | WO 2005/059781 | 6/2005 |
| WO | WO 2005/124619 | 12/2005 |
| WO | WO 2006/050278 | 5/2006 |
| WO | WO 2007/004158 | 1/2007 |
| WO | WO 2007/014271 | 2/2007 |
| WO | WO 2007/106393 | 9/2007 |
| WO | WO 2008/022289 | 2/2008 |
| WO | WO 2008/042614 | 4/2008 |
| WO | WO 2008/054403 | 5/2008 |
| WO | WO 2008/076343 | 6/2008 |
| WO | WO 2008/127288 | 10/2008 |
| WO | WO 2008/147918 | 12/2008 |
| WO | WO 2009/061342 | 5/2009 |
| WO | WO 2009/076555 | 6/2009 |

(56) References Cited

FOREIGN PATENT DOCUMENTS

| WO | WO 2009/117518 | 9/2009 |
|---|---|---|
| WO | WO 2009/132114 | 10/2009 |
| WO | WO 2010/045160 | 4/2010 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2013/009920 | 1/2013 |
| WO | WO 2014/018900 | 1/2014 |
| WO | WO 2015/162681 | 10/2015 |
| WO | WO 2018/039377 | 3/2018 |
| WO | WO 2018/144612 | 8/2018 |

OTHER PUBLICATIONS

Gao et al., "Exploring Temporal Effects for Location Recommendation on Location-Based Social Networks", RecSys'13, Oct. 12-16, 2013, Hong Kong, China, pp. 93-100.

MERit Credit Engine™, Diagram, http://creditengine.net/diagram.htm, copyright 1997, pp. 1.

Nelson et al., "Efficient, Automatic Web Resource Harvesting", Conference: Eigth ACM International Workshop on Web Information and Data Management (WIDM 2006), Arlington, Virginia, USA, Nov. 10, 2006, pp. 8.

"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-647A-444F-BD11-8B4D7D8B3532,frame . . . in 6 pages.

Reinartz et al., "On the Profitability of Long-Life Customers in a Noncontractual Setting: An Empirical Investigation and Implications for Marketing" Journal of Marketing, Oct. 2000, vol. 64, pp. 17-35.

"STAGG Variables Sum Up Credit Attributes for Automated Decisions", PRWeb, May 11, 2011, pp. 2. http://www.prweb.com/releases/2011/5/prweb8404324.htm.

Tan et al., "Modeling of Web Robot Navigational Patterns", 2000, Department of Computer Science; University of Minnesota, pp. 7.

Yuan et al., "Time-Aware Point-of-Interest Recommendation", SIGIR'13, Jul. 28-Aug. 1, 2013, Dublin, Ireland, pp. 363-372.

Official Communication in Australian Patent Application No. 2012281182, dated Jul. 8, 2014.

Official Communication in Australian Patent Application No. 2012281182, dated May 19, 2015.

Official Communication in European Patent Application No. 12811546.6, dated Sep. 18, 2015.

International Search Report and Written Opinion for Application No. PCT/US2017/048265, dated Dec. 5, 2017.

International Preliminary Report on Patentability in Application No. PCT/US2017/048265, dated Mar. 7, 2019.

International Search Report and Written Opinion for Application No. PCT/US2018/016258, dated May 16, 2018.

U.S. Appl. No. 14/244,186, U.S. Pat. No. 10,102,536, Micro-Georgraphic Aggregation System, filed Apr. 3, 2014.

U.S. Appl. No. 12/705,489, filed Feb. 12, 2010, Bargoli et al.

U.S. Appl. No. 12/705,511, filed Feb. 12, 2010, Bargoli et al.

International Preliminary Report on Patentability in Application No. PCT/US2018/016258, dated Aug. 15, 2019.

Official Communication in Indian Patent Application No. 490/DELNP/2014, dated Jun. 20, 2019.

* cited by examiner

| ZIP+4 ⟵601 | FROM ⟵602 | To ⟵603 | HH ⟵604 | MOSAIC ⟵605 | ROLL ID ⟵606 | HH ⟵607 | AVG ASSETS ⟵608 |
|---|---|---|---|---|---|---|---|
| 12345-0001 | 1 KING RD | 15 KING RD | 3 | A01 | 4 | 5 | $2,100,500 |
| 12345-0002 | 1 ROCKY RD | 18 ROCKY RD | 2 | A01 | | | |
| 12345-0003 | 50 KING RD | 70 KING RD | 3 | C13 | 31 | 7 | $50,000 |
| 12345-0004 | 1 NEIGHBORHOOD LN | 20 NEIGHBORHOOD LN | 4 | A01 | | | |
| 12345-0005 | 23 SPRING ST | 26 SPRING ST | 7 | A01 | 0 | 7 | $1,450,000 |
| 12345-0006 | 45 HARBOUR RD | 75 HARBOUR RD | 3 | A02 | 48 | 9 | $1,500,000 |
| 12345-0007 | 20 ROCKY RD | 35 ROCKY RD | 6 | A02 | | | |
| 12345-0008 | 123 SHORE LINE CT | 135 SHORE LINE CT | 4 | A03 | 22 | 10 | $325,000 |
| 12345-0009 | 45 PINE STREET | 55 PINE STREET | 6 | A01 | | | |
| 12345-0010 | 45 EVERGREEN | 70 EVERGREEN | 1 | A01 | 75 | 9 | $750,000 |
| 12345-0011 | 15 BIRDS EYE | 25 BIRDS EYE | 4 | B01 | | | |
| 12345-0012 | 1 SPRING | 10 SPRING | 4 | C12 | | | |
| 12345-0013 | 20 FRIENDSHIP LN | 25 FRIENDSHIP LN | 1 | A01 | 86 | 7 | $70,000 |
| 12345-0014 | 30 RAINBOW RD | 35 RAINBOW RD | 3 | A01 | | | |
| 12345-0015 | 40 PEACH ST | 45 PEACH ST | 3 | A01 | | | |
| 12345-0016 | 15 TOADSTOOL CIR | 20 TOADSTOOL CIR | 1 | A03 | 80 | 10 | $150,000 |
| 12345-0017 | 25 BOWIE DR | 30 BOWIE DR | 2 | A04 | | | |
| 12345-0018 | 45 KING RD | 50 KING RD | 1 | A05 | | | |
| 12345-0019 | 15 PEACH ST | 25 PEACH ST | 6 | A01 | | | |

FIG. 6

MICRO-GEOGRAPHIC AGGREGATION SYSTEM

CROSS-REFERENCE TO RELATED APPLICATIONS

This application is a continuation of U.S. patent application Ser. No. 14/244,186, filed Apr. 3, 2014, which claims the benefit of priority under 35 U.S.C. § 119(e) of U.S. Provisional Application No. 61/905,021, filed Nov. 15, 2013, the disclosure of which is hereby incorporated by reference in its entirety.

BACKGROUND

Geographic aggregation is a common approach to creating anonymous data from individual consumer or household data that may otherwise be too private to disclose. Units of geographic aggregation can be based on a variety of classification schemes with different levels of granularity, for example state, county, city or neighborhood.

SUMMARY

Postal codes are a popular choice for geographic aggregations, both for granularity and ease of use for marketing applications. In the United States, the US Postal Service assigns each deliverable address both a 5-digit "ZIP Code™" as well as a 9-digit, ZIP+4 code (or "ZIP9"), the latter generally defined in terms of a street address range. Many of these ZIP9 codes encompass only a small number of unique households. However, to protect privacy, a number of policies, rules and regulations have been enacted which may limit or restrict the use of data for ZIP9 codes which include too few households. The high degree of segmentation contributes to more variance in demographic, socio-economic, behavioral, and other data associated with ZIP and ZIP9 codes. Such variance in the data set may be desirable to some entities, such as marketers and certain consumers, who value targeted offers and advertising.

The present disclosure describes systems and methods for automatically combining or "rolling-up" data associated with one or more geographic region codes, in particular ZIP9 codes, such that the combination or "rollup" satisfies a minimum threshold of granularity (e.g., a minimum number of households) to protect anonymity and ensure compliance with privacy regulations or policies, while preserving variance of the underlying data associated with the geographic regions.

Some approaches to protect anonymity and ensure compliance with privacy regulations may involve suppressing or removing certain data which do not comply with privacy rules (e.g., by removing a "non-compliant" ZIP9 from a data set, wherein the non-compliant ZIP9 has a number of households less than a required minimum). Other approaches may involve applying default values to non-compliant ZIP9s, or analyzing data at a different ZIP-level which more frequently satisfies minimum number of household requirements, such as the 5-digit ZIP code or the first 7 digits of the ZIP+4 code.

However, such approaches may have drawbacks which can include less accurate overall data, loss of granularity, and/or loss of variance which may be of interest in certain cases where specificity of data carries high value, such as in direct-mail marketing campaigns and similar targeted advertising efforts. This may be particularly true when certain data attributes associated with a particular ZIP9 are skewed, such as the case may be with respect to household wealth which is correlated to ZIP9s having smaller number of households. Thus, in some cases more granular data (e.g., at the ZIP9 level or as close to the ZIP9 level as permissible to maintain privacy and anonymity) is not only more valuable, but may even be essential in order to provide an indication of useful information that data at the ZIP5 or ZIP7 level do not provide.

The methods and processes described in the present disclosure provide an algorithm for rolling-up ZIP9 codes that trades off between granularity (e.g., to keep the number of households in a rolled-up ZIP9 group as small as possible), proximity (e.g., to group ZIP9s which are within a certain geographic distance of each other as much as possible given other constraints and criteria), and/or similarity of data attributes associated with each ZIP9. Data attributes may include, but are not limited to, demographic data, socio-economic data, psychographic data, behavioral data, credit data including aggregated and/or anonymized credit statistics, wealth data, and/or other similar types of data. One example of socio-economic data or lifestyle segmentation which will be referred to in examples throughout this disclosure is Experian's MOSAIC® service; however, any other segmentation data may be used as data attributes for identifying similar ZIP9s or households.

At a high level, the rollup process executed by the micro-geographic aggregation system 100 operates by identifying one or more geographic units (e.g., ZIP codes, ZIP5s, ZIP7s, ZIP9s, census tract data, street address ranges, grid-based geographic regions corresponding to a map, and any other finite geographic area) having a number of households below a minimum or threshold amount. Then, data filters may be applied in order to find or determine which geographic units are candidates for rollup. For example, data filtering may be applied to filter out or remove ZIP9s which are dissimilar based on one or more attributes (e.g., average assets, MOSAIC® code, and so on). Once the geographic unit candidates are identified, the rollup process scores the candidates and selects one or more with the best scores for rollup or pairing. For example, the candidate ZIP9s may be scored relative to a target ZIP, ZIP7, ZIP9 or relative to each other (e.g., pairwise) in order to identify strong potential for rollup (e.g., combination or grouping of two or more ZIP9s). Once a rollup group has been created, identified, or updated, the rollup process combines the number of households for each constituent geographic unit to determine a number of households in the rollup group. If the number of households in the rollup group is less than the minimum or threshold amount, the rollup process may repeat recursively or indefinitely until the identified geographic units have been rolled up into respective rollup groups with at least the minimum number of households.

The rollup algorithm or processes described herein can be applied to any set of one or more target variables and one or more explanatory variables relating to ZIP data attributes, such that as ZIP9s are evaluated for possible combination in a rollup, the similarity and/or trade-offs between associated target variables and associated explanatory variables are weighted. The examples herein will use average assets as an example target variable, and MOSAIC® codes as an example explanatory variable. However, in general any type of target variable and/or explanatory variable may be used, depending on the embodiment, the particular context, and/or a particular request from a requesting entity. A target variable is generally understood to be a continuous variable such as a specific number or amount, while an explanatory variable may generally be a category or classification variable which may represent, for example, general characteristics or attributes of members of the category or classification which may not correspond directly to a numeric value.

The micro-geographic aggregation system may apply the rollup process to data of different granularities, for different geographic regions, across a wide variety of data attributes. The micro-geographic aggregation system may provide a requesting entity with the ability to dynamically query consumer data on the fly in a customized manner, simultaneously obscuring private data to protect anonymity while providing high-value and insightful data for use in intelligent and customized marketing. While ZIP9s are discussed herein, the systems and methods discussed herein are equally applicable to other geographic unit comprising groupings of households or individuals.

BRIEF DESCRIPTION OF THE DRAWINGS

FIG. 6 illustrates an example geographic unit rollup output which may be provided by the rollup processes described herein, using the micro-geographic aggregation system of FIG. 8.

DETAILED DESCRIPTION

Embodiments of a micro-geographic aggregation system will now be described with reference to accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Overview

Generally described, a micro-geographic aggregation system is a computer system that automatically and optimally determines combinations, aggregations, or "rollups" of geographic units, such as ZIP9 codes, in order to satisfy a minimum or threshold number of households which may be required, for example, to preserve anonymity of the constituent households associated with each ZIP code.

Figure 8:
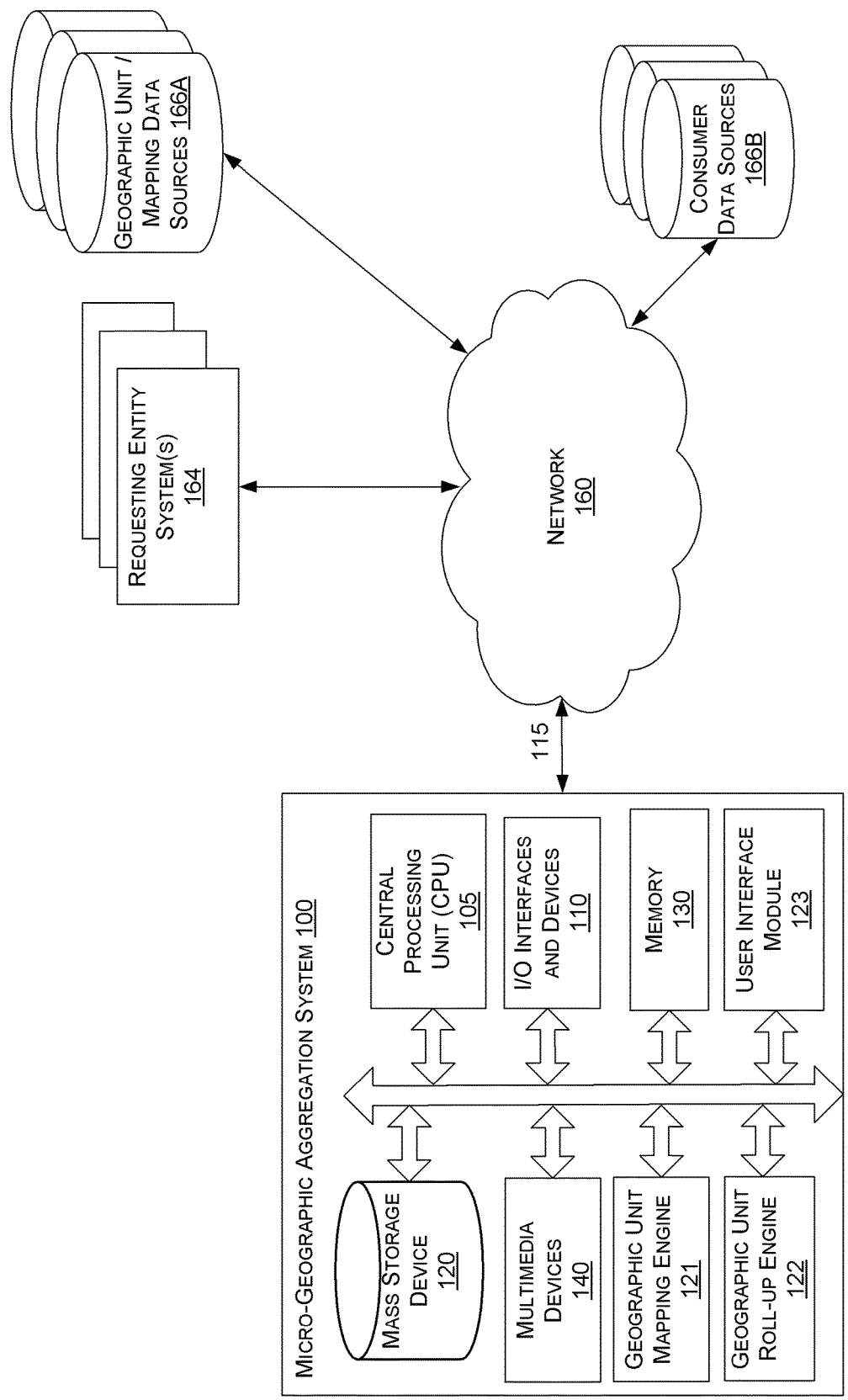
FIG. 8 is a block diagram of an implementation of an illustrative micro-geographic aggregation system.

One example embodiment of a micro-geographic aggregation system is the micro-geographic aggregation system 100 shown in FIG. 8. The micro-geographic aggregation system 100 may include one or more sub-systems, engines, or modules such as a geographic unit mapping engine 121, a geographic unit rollup engine 122, and/or a user interface module 123, configured to perform the methods and processes described herein. The micro-geographic aggregation system 100 may also access or be in communication with one or more data sources, including geographic unit/mapping data sources 166A and/or consumer data sources 166B. Each of these systems and components is described in more detail with reference to FIG. 8 herein.

Figure 1:
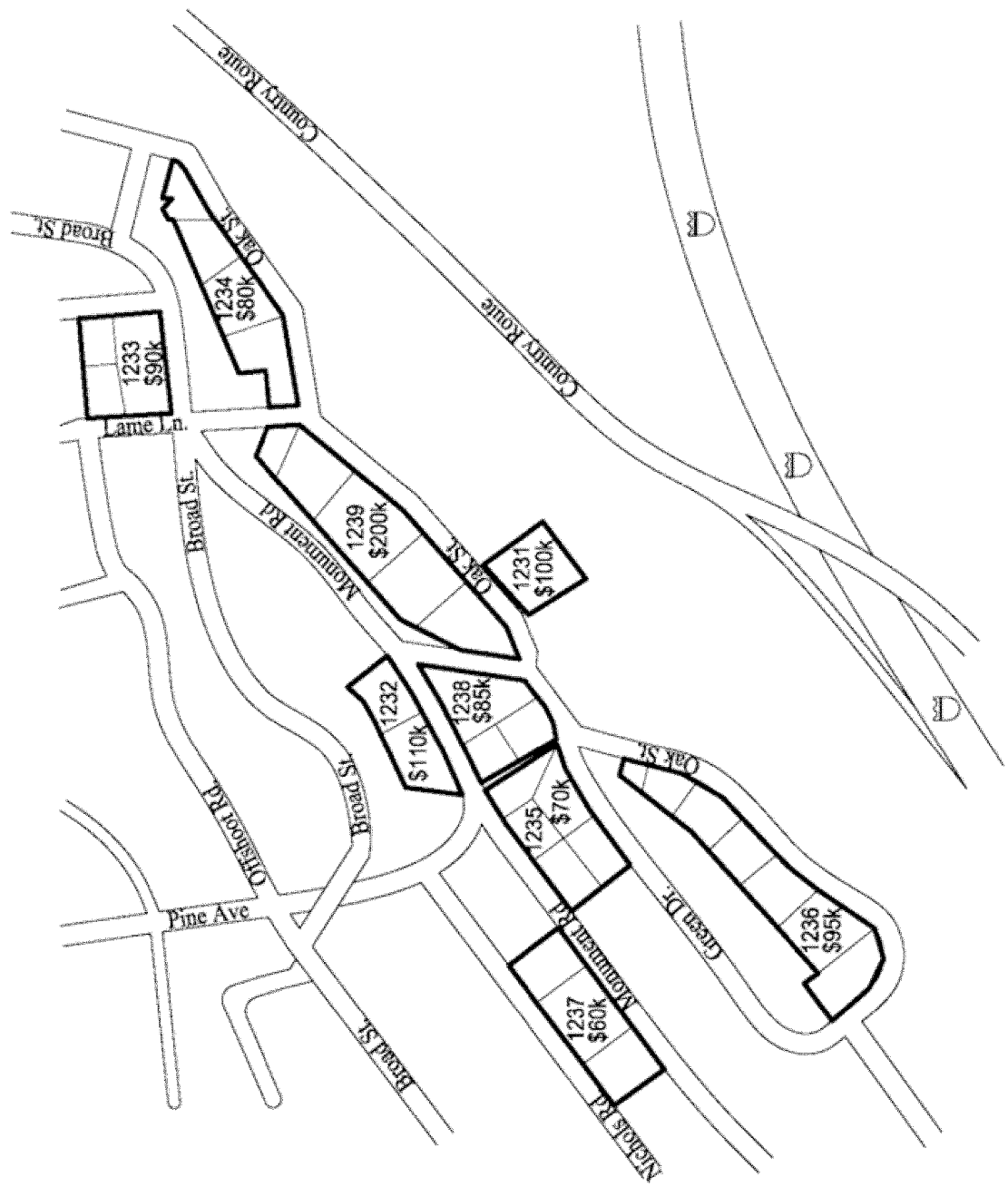
FIG. 1 is a map illustrating one example of challenges posed by ZIP9 fragmentation for a small geographic region which the geographic unit rollup processes described herein are designed to address.

FIG. 1 is an example map that illustrates certain challenges posed by geographic units (e.g., ZIP9s) of disparate size and other characteristics for a small geographic region which the geographic unit rollup processes described herein are designed to address. The map shows several ZIP9 area codes for a particular region, each of which has been outlined to show the varying number of households within each ZIP9. Corresponding to each ZIP9 is an average quantity of assets for that ZIP9 (which may be known, for example, based on consumer level data accessed from the consumer data source 166B). Such granular data may be of particular interest to an investment company, for example, which may want to target particular ZIP codes or households within a certain asset range or above a certain asset threshold. However, as the map of FIG. 1 shows, many of these ZIP9 codes include less than four households, and in some cases only one or two households. To protect the privacy of these households, while preserving the value in the data variance across ZIP9 codes in this region, the micro-geographic aggregation system 100 can analyze attributes of the ZIP9 codes in the area, identify potential ZIP9 codes for combination based on similarity, and rollup these ZIP9 codes into a rollup group which meets a minimum number of households threshold and with similar average assets and/or other attributes. Thus, for example in FIG. 1, ZIP9 codes 1231 (one household, $100K assets), 1232 (two households, $110K average assets), and 1233 (three households, $90K average assets) may be rolled up to create a rollup group with a combined household total of six and an average asset attribute of $98K. ZIP9 codes 1237 (three households, $60K average assets) and 1238 (three households, $85K assets) also might be eligible for rollup if the minimum number of households is four; however, these ZIP9s may not be rolled up together in some instances if, for example, the difference in average assets (e.g., $85k vs $60k) is relatively too high to be considered similar enough for rollup grouping. This determination will depend on the particular embodiment or implementation of the rollup algorithm and various criteria for filtering and rollup that are applied. Or, in alternate example, ZIP9s 1233 and 1238 might be considered for possible rollup together since they have similar average assets values ($90k and $85k respectively). FIG. 1 also illustrates a couple of ZIP9s (e.g., 1236 and 1239) with at least five households, and thus these ZIP9s may not need to be rolled-up or aggregated in cases where the minimum number of households is five. Instead, each of these ZIP9s may not be rolled up or, in one embodiment, may be assigned to a rollup "group" which comprises only the respective ZIP9 (e.g., a "singleton").

Examples of Methods Performed by a Micro-Geographic Aggregation System

Figure 2:
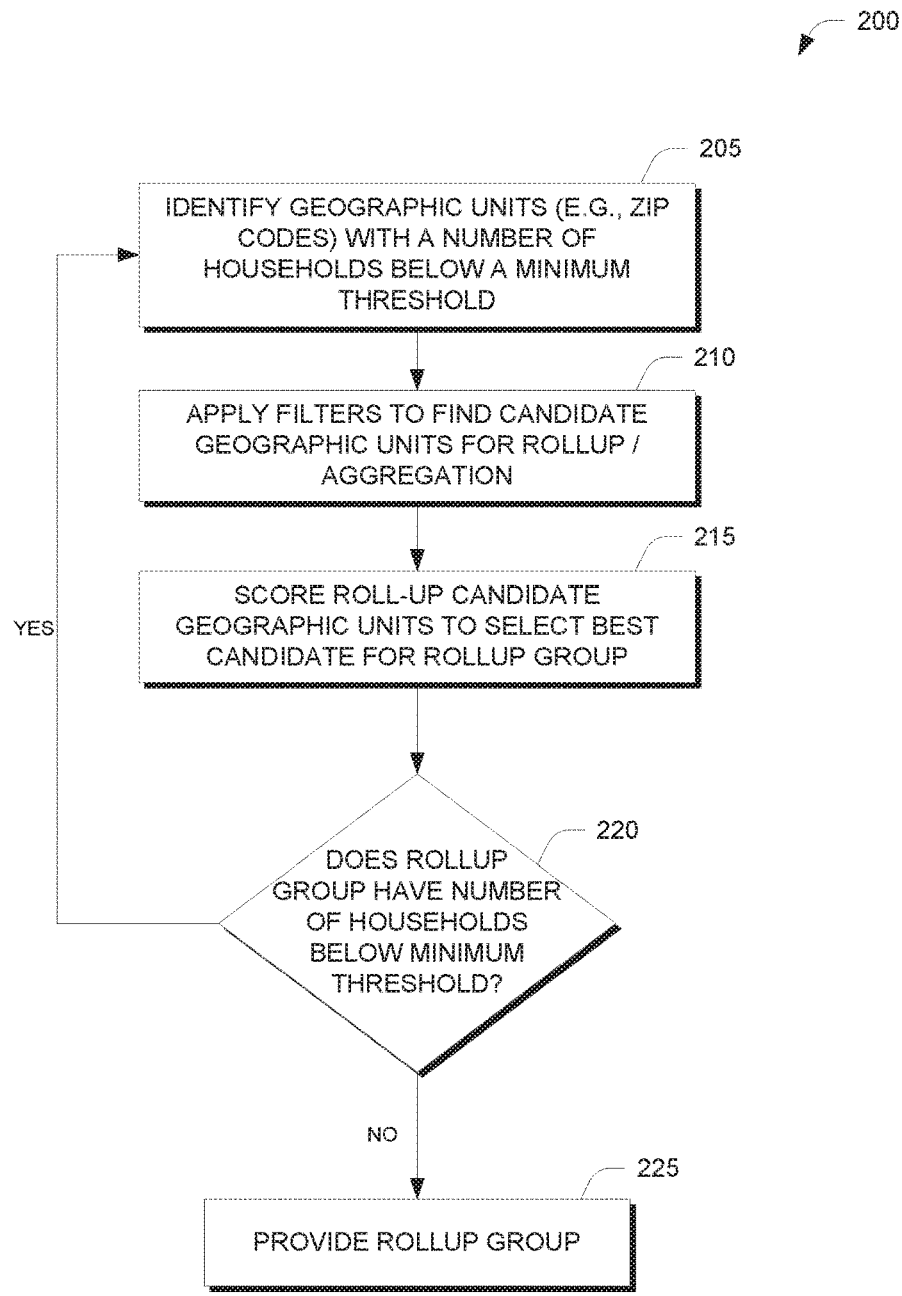
FIG. 2 is a flowchart of a process for rolling up one or more geographic units, such as ZIP9 codes, together into a rollup group, using the micro-geographic aggregation system of FIG. 8.
Figure 3:
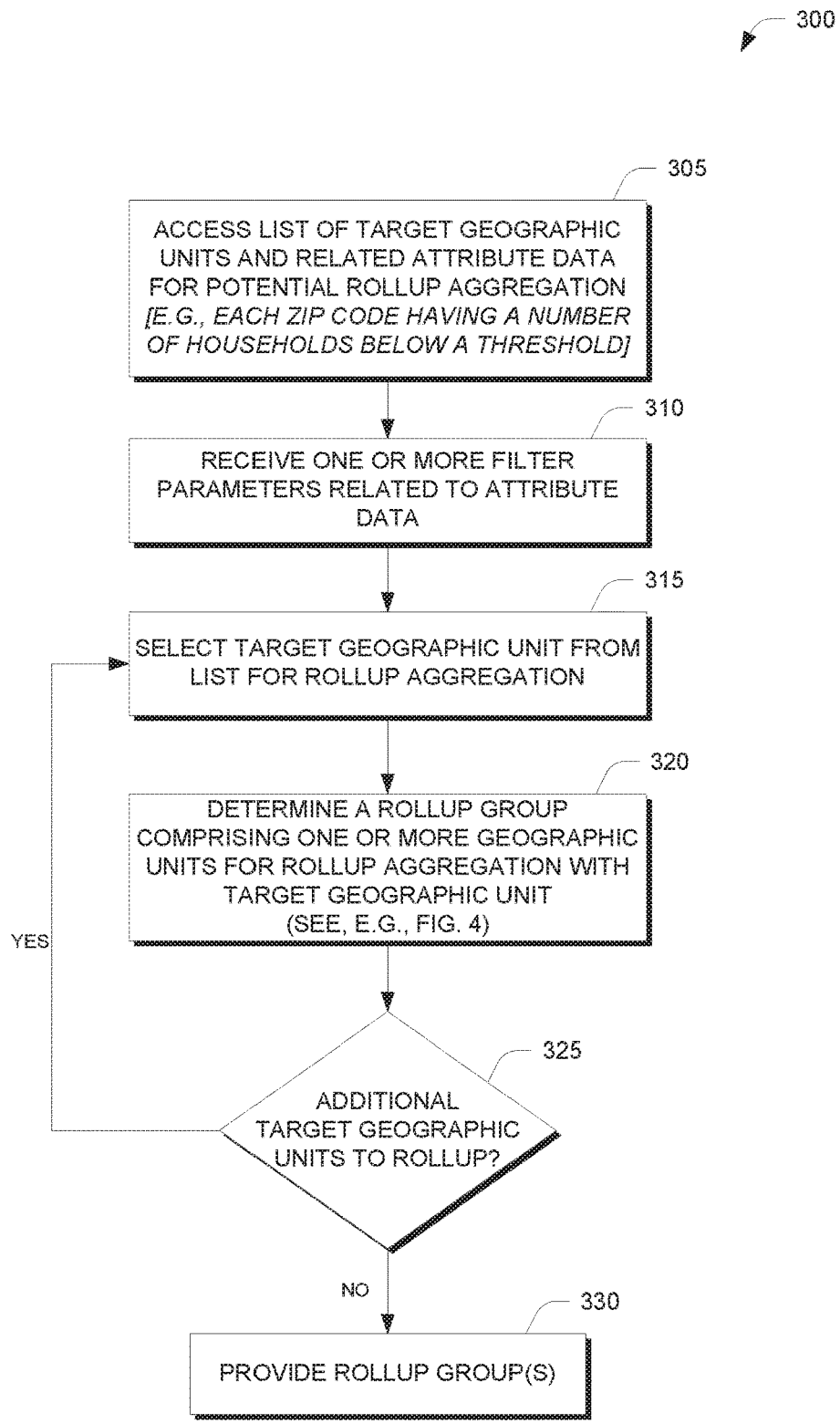
FIG. 3 is a flowchart of a process for combining one or more geographic units, such as ZIP9 codes, together into one or more rollup groups, using the micro-geographic aggregation system of FIG. 8.
Figure 4:
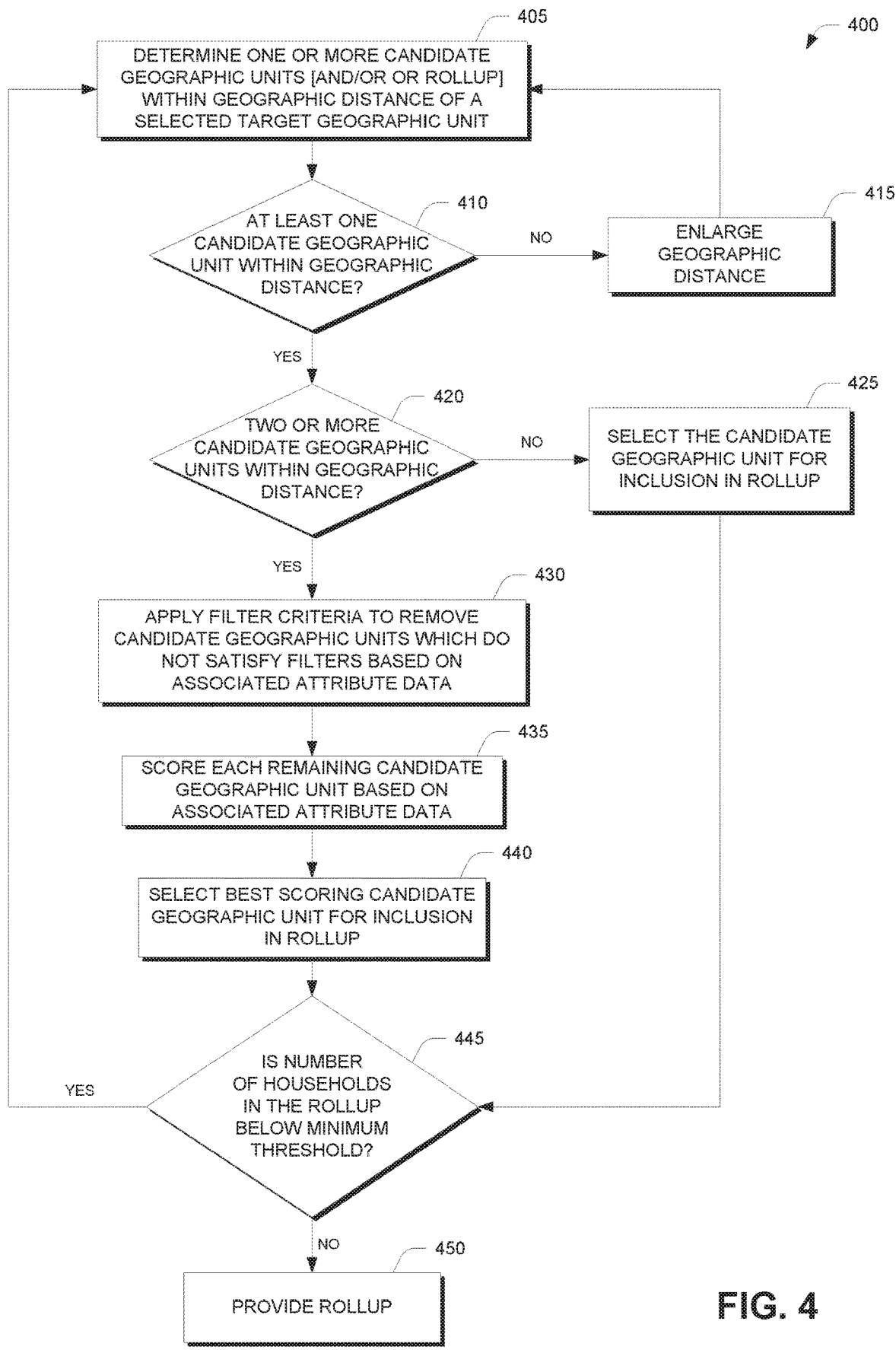
FIG. 4 is a flowchart of a process for identifying, scoring and selecting one or more geographic units, such as ZIP9 codes, for inclusion in a rollup group, using the micro-geographic aggregation system of FIG. 8.

FIGS. 2, 3, and 4 are flowcharts for various embodiments of micro-geographic aggregation system processes. In some implementations, the processes are performed by embodiments of the micro-geographic aggregation system 100 described with reference to FIG. 8 or by one or more of its components, such as the geographic unit mapping engine 121, geographic unit rollup engine 122, and/or user interface module 123. The example scenarios are intended to illustrate, but not to limit, various aspects of these systems and/or services. In one embodiment, the processes can be dynamic, with some procedures omitted and others added. In one example, multiple instances of the processes may occur concurrently, for different micro-geographic aggregation systems. Depending on the embodiment, the methods may include fewer or additional blocks and/or the blocks may be performed in an order different than illustrated.

FIG. 2 is a flowchart illustrating one embodiment of a high-level process 200 for combining one or more geographic units, such as ZIP codes, together into a rollup group. The process 200 may be executed, for example, by the geographic unit rollup engine 122 of the micro-geographic aggregation system 100 of FIG. 8.

At block 205, the micro-geographic aggregation system 100 identifies, from a set of geographic data, one or more geographic units with a number of households below a minimum threshold, such as within a geographic area of interest (e.g., a city or state that is the target of a marketing campaign) to a company that is requesting geographically aggregated data. For example, the minimum threshold may be a value provided by a requesting entity or client using the micro-geographic aggregation system 100. The minimum threshold may also be a minimum required by government (e.g., Federal, state, municipality, etc.) rules and regulations, including consumer privacy regulations. The one or more geographic units may also be identified based on proximity to each other or to a geographic unit that has been selected for potential rollup, or based on other attributes as will be discussed in more detail herein. As a specific example, at block 205 the micro-geographic aggregation system may find 5 ZIP9 codes with 5 or fewer households per ZIP9.

At block 210, the micro-geographic aggregation system 100 applies filters to the set of geographic data and the geographic units in order to find candidates for potential rollup or aggregation. Filters may be applied, for example, in order to remove those candidate ZIP codes which are not close enough in proximity (e.g., geographic distance), not similar enough based one or more attributes of interest (e.g., average assets per household, lifestyle characteristics or attributes as reflected in, for example, a MOSAIC® code, etc.), or on other criteria. In some embodiments, the filters may be accessed from the data sources 166A or 166B, or otherwise be preconfigured by the micro-geographic aggregation system 100. In another embodiment, such as the example process 300 illustrated and described with reference to FIG. 3 herein, the filters may be accessed from or provided by a requesting entity system 164 as part of a rollup request.

At block 215, the micro-geographic aggregation system 100 scores each of the candidate geographic units in order to select the best candidate for a rollup group. Scoring of the candidate geographic units may be performed a number of different ways depending on the embodiment or implementation. The scoring may be performed relative to a target or base reference geographic unit (or a rollup group), such that each candidate may be compared on the same basis. One example of how the scoring may be performed is discussed in further detail herein with respect to block 435 of FIG. 4. In one embodiment, more than one candidate may be selected. For example, to improve speed or efficiency of processing, the two best scoring candidates may be selected for inclusion in a rollup group. Once the best scoring candidate(s) have been selected, the candidate(s) are combined with the base reference geographic unit to form a new rollup group, or added to a base reference rollup group if one exists.

At block 220, the micro-geographic aggregation system 100 determines whether the rollup group has a combined number of households below the minimum threshold. In response to a determination that the number of households in the rollup group is still below the minimum threshold, the process 200 returns to block 205 to repeat block 205 to block 220. In response to a determination that the number of households in the rollup group is above or equal to the minimum threshold, the process 200 can proceed to block 225.

At block 225, the micro-geographic aggregation system 100 provides the rollup group as output, for example to another process of the micro-geographic aggregation system 100 or to a requesting entity system 164. For example, after the rollup process is finished, a rollup ID (or "roll ID") of "0" may be assigned to each ZIP9 that did not need grouping (e.g., a singleton) to indicate that the singleton is not associated with any rollup group. Then, the output may be provided in a number of different formats. For example, in one embodiment, the list may be provided as a list of ZIP9's and associated roll IDs, along with one or more attributes or metrics of interest for the ZIP9 (e.g., average assets per household, number of households, MOSAIC® code, etc.). In another embodiment, the list may be provided as a list of roll IDs with a list of one or more associated ZIPs in the rollup group, along with one or more attributes or metrics of interest or related to the rollup (e.g., average assets for the group, total number of households for the group, MOSAIC® code(s) for the group, etc.). One example of a rollup output is illustrated and described with reference to FIG. 6 herein.

FIG. 3 is a flowchart illustrating one embodiment of a high-level process 300 for combining one or more geographic units (e.g., ZIP9 codes) together into a rollup group. The process 300 may be executed, for example, by the geographic unit rollup engine 122 of the micro-geographic aggregation system 100 of FIG. 8.

The process 300 involves similar routines as those described with reference to process 200 of FIG. 2, but presents alternatives which may be implemented in some embodiments of the micro-geographic aggregation system 100. For example, process 300 involves receiving one or more filter parameters or criteria, such as from a requesting entity system 164, related to ZIP code attributes (e.g., at block 310). The filters may be applied in a similar process as described at block 210 of FIG. 2, but the example process 300 illustrates how these filters may be custom filters provided by a third party requesting entity, such as a company that wishes to obtain aggregated or rolled-up ZIP9 data based on filter criteria or business rules which are tailored to, for example, its particular type of business or its particular business requirements. For example, an investment or financial services firm might be interested in filtering ZIP9 data based on certain financial metrics like average assets per household, average debt/liabilities per household, and the like. Or, in another example, a credit account servicing firm (e.g. a credit card company) might be interested in filtering ZIP9 data based on certain metrics like average credit score per household, average number of pre-college or post-college children per household, and the like. The micro-geographic aggregation system 100 may be configured to enable all such examples of custom filtering via the process 300.

In some embodiments, filters and/or filter criteria may not be used at all, for example depending on the number of candidate ZIP codes identified for potential rollup. For example, if a small number of candidate geographic units are identified, it may be unnecessary or undesirable to filter the list and instead score each candidate in an unfiltered list. If a large number of candidate geographic units are identified, it may be necessary or desirable to filter the list and score only a subset of the candidates. For example, in some embodiments, the number of candidate geographic units may number in the hundreds, thousands, or more, and therefore filtering the list may be of particular benefit to improve speed and efficiency due to the overall complex and computationally intense rollup aggregation process. To further illustrate these alternative embodiments, the process 300 of FIG. 3 omits the optional filtering routine (e.g., applying filters as described in other embodiments, such as at block 210 of FIG. 2 or at block 430 of FIG. 4).

At block 305, the micro-geographic aggregation system 100 accesses a list of target geographic units and related attribute data for potential rollup aggregation. In one embodiment, the list of target geographic units may be accessed from geographic unit/mapping data source 166A. Related ZIP code attribute data may be accessed from the consumer data source 166B, which may store for example consumer and/or socio-economic data associated with the geographic units. In another embodiment, the list of target geographic units may be provided by a requesting entity, for example as part of request to perform a rollup operation. The list of target geographic units may be, for example, one or more ZIP9 codes, each of which has a number of households below a threshold.

At block 310, the micro-geographic aggregation system 100 receives one or more filter parameters related to the geographic units' attribute data. For example, the filters may be accessed from or provided by a requesting entity system 164 as part of a rollup request.

At block 315, the micro-geographic aggregation system 100 selects a target geographic unit from the list for rollup aggregation. In one embodiment, before the target geographic unit is selected from the list, the list may be sorted by one or more sorting criteria to facilitate processing of the list. For example, the list of targets may be sorted by the number of households in each target geographic unit with the smallest number at the top of the list. This would then ensure that the rollup algorithm would first attempt to rollup those geographic units with the smallest number of households.

At block 320, the micro-geographic aggregation system 100 determines a rollup group comprising one or more geographic units for rollup aggregation with the target geographic units. This rollup process may be performed, for example, by the process 400 illustrated and described in more detail with reference to FIG. 4 herein.

At block 325, the micro-geographic aggregation system 100 determines whether there are additional target geographic units in the list to rollup. In response to a determination that there are additional target geographic units in the list to rollup, the process 300 returns to block 315 and the micro-geographic aggregation system 100 selects the next target from the list for rollup. If there are not additional targets in the list to rollup, the process 300 may proceed to block 330.

At block 330, the micro-geographic aggregation system 100 provides the rollup group or groups as output, for example to another process of the micro-geographic aggregation system 100 or to a requesting entity system 164. This process is similar to the process described at block 225 of process 200 shown in FIG. 2 herein.

FIG. 4 is a flowchart illustrating one embodiment of a process 400 for combining one or more geographic units, such as ZIP9 codes, together into a rollup group. The process 400 may be executed, for example, by the geographic unit rollup engine 122 of the micro-geographic aggregation system 100 of FIG. 8. The process 400 may be for example a sub-routine which is invoked as part of the process 300 of FIG. 3, for example at block 320, to execute a particular embodiment of the rollup process. In particular, the process 400 includes several decision blocks and alternative approaches to perform the rollup depending on the underlying ZIP code data, the number of ZIP codes found matching various rollup conditions (e.g., proximity, granularity, filter criteria or conditions for attribute data associated with the geographic units, and so on). Depending on the particular embodiment, the process 400 may be performed independently from the process 300, separately or in parallel to process multiple geographic unit rollups for a plurality of candidate geographic units.

At block 405, the micro-geographic aggregation system 100 determines or identified one or more candidate geographic units (e.g., ZIP9 codes) within a geographic distance of a selected target ZIP code. In one implementation, the geographic distance may be set or preconfigured to a certain radius that may be optimal based on the geographic region of the selected target geographic unit. For example, the geographic distance may be larger if the target is in a remote or rural geographic location that is likely to have a small number of candidates within a large area. Or, the geographic distance may be smaller if the target is in a densely populated geographic location that is likely to have a large number of candidates within a small area. The geographic distance may also be based on other conditions such as the average number of geographic units within different radius values. In one example embodiment, the geographic distance may initially be set to 0.75 miles. The micro-geographic aggregation system 100 may access data from geographic unit/mapping data source 166A in order to identify all ZIP9 codes within the geographic distance of the selected target ZIP9 code, and use the identified ZIP9 codes as candidates for rollup or aggregation with the selected target ZIP9 code.

Finding all geographic units within a geographic distance of a selected target geographic unit may be done in various ways. In one embodiment, a two-step block search approach may be used to efficiently find all ZIP9s for a given radius. First, given the latitude/longitude coordinates for the lower left (A) and upper right corner (B) of the United States, create a grid with 1° latitude×1° longitude blocks. Then, for each 1×1 block, find all the ZIP9's that belong to or fall within the block to create a mapping or index of ZIP9s-to-blocks. For ZIP9s which overlap more than one block, the ZIP9 may be assigned to the block with the greatest degree of overlap. This information may be saved for use in subsequent block searches and need not be repeated every time. Second, to find all ZIP9's within a certain distance of a given ZIP code, from the given ZIP code's latitude/longitude coordinates and radius R, calculate the latitude/longitude coordinates for the lower left (C) and upper right (D) corner of a bounding box on the grid. Then, the index of the blocks to which points C&D belong may be used to determine which ZIP9s are within the given radius, based on the mapping of ZIP9s-to-blocks created before. The initial search range could then be confined to the only the blocks within the C&D index instead of the whole universe of ZIP9's across the United States.

In one embodiment, at block 405 the micro-geographic aggregation system 100 may also, or instead, determine one or more candidate ZIP9 rollups within the geographic distance of the selected target ZIP9 code. This may be the case, for example, if and when the process 400 iteratively repeats block 405 through block 445 to generate rollups dynamically using a "local optimum" or "greedy" algorithm approach. For example, on a first iteration of the process 400, a candidate ZIP9 code list might include three ZIP9 codes with a number of households equal to 1, 2, and 3. At the end of a first iteration, the first candidate ZIP9 code may be selected for inclusion in a rollup with the selected target ZIP9 code, and the rollup may be added back to the candidate list for further potential rollup (e.g., if the combined number of households in the rollup is still less than the minimum threshold). Then, on a subsequent iteration of the process 400, the rollup may be included on the candidate list and potentially be selected for inclusion with another candidate ZIP9 code or selected target ZIP9 code. In some embodiments, rollups may have been previously determined and stored along with other ZIP code/mapping data at data source 166A, and retrieved or accessed in subsequent executions of the rollup process 400.

Next at block 410, the micro-geographic aggregation system 100 determines whether there is at least one candidate geographic unit identified or found within the geographic distance at block 405. In response to determining that there are no candidate ZIP codes identified, the process 400 may proceed to block 415. In response to determining that there is at least one candidate ZIP code identified, the process 400 may proceed to block 420.

At block 415, the micro-geographic aggregation system 100 enlarges the geographic distance in order to locate at least one candidate geographic unit within a range of the selected target geographic unit. For example, in one embodiment the geographic distance may be increased to an amount equal to the original distance multiplied by the square root of 2 (or any other distance which may be optimal or otherwise desired). As with the routine performed at block 405, the amount by which the geographic distance is to be increased may depend on the geographic region associated with the selected target geographic unit. For example, for a rural geographic region, the geographic distance may be increased by a larger amount in order to increase the likelihood of finding at least one candidate. Once the geographic distance has been enlarged, the process 400 may return to block 405 and begin the rollup process again. The process 400 may repeat blocks 405, 410, and 415 iteratively an indeterminate amount of times until at least one candidate geographic unit is identified.

At block 420, the micro-geographic aggregation system 100 determines whether two or more candidate geographic units identified or found within the geographic distance at block 405. In response to determining that only one candidate ZIP code has been identified, the process 400 may proceed to block 425. If two or more one candidate ZIP codes have been identified, the process 400 may proceed to block 430.

At block 425, the micro-geographic aggregation system 100 selects the identified candidate geographic unit for inclusion in a geographic unit rollup with the selected target ZIP code. The process 400 may then proceed to block 445.

At block 430, the micro-geographic aggregation system 100 applies one or more filter criteria to the candidate geographic units in order to remove candidates which do not satisfy the filters, based at least in part on data associated with the candidate geographic units. In an embodiment the desired output of block 430 is a list of candidate ZIP9 codes with a relatively high degree of similarity to the selected target ZIP9 code (e.g., filter out ZIP9s with low similarity based on certain attributes). Data associated with the candidate geographic units may be accessed by the micro-geographic aggregation system 100 for example from geographic unit/mapping data sources 166A. In one embodiment, filter criteria may be preconfigured or optimized, for example based on criteria which may be known or learned over time (e.g., over multiple rollup processes/iterations) via a learning algorithm. In another embodiment, filter criteria may be selectable or configurable by an end user, such as a requesting entity 164, and received by the micro-geographic aggregation system 100, for example via a user interface, such as the user interface shown in FIG. 5A, which may be provided as part of a web service.

A particular example of how filter criteria or rules may be applied to remove candidate geographic units from the list for potential inclusion in the rollup is provided as follows. Consider a scenario in which an average assets per household is the target variable, and a MOSAIC® code is the explanatory variable. For the average assets variable, a filter or rule may be applied to remove any candidate ZIP9 codes which are not within a certain percent (e.g., 20%) or range (e.g., plus or minus $5,000) of the average assets associated with the target ZIP code. In some instances the rollup algorithm may be configured to automatically treat asset values below a minimum amount as the minimum amount (e.g., treat any asset value below $5,000 as $5,000 for purposes of rollup aggregation). For the MOSAIC® code variable, a filter may be applied to remove any candidate ZIP9 codes which do not have the same category or sub-category (e.g., the same letter group) of the MOSAIC® code associated with the target ZIP9 code. In some instances the rollup algorithm may be configured to automatically remove any candidate ZIP9 code which does not have an associated MOSAIC® code. The geographic distance may also be considered another type of filter criteria or rule that is based on proximity (e.g., initially only candidate ZIP9 codes within a certain radius of the target ZIP9 code may be considered for potential rollup).

Other types of filter criteria or rules may be applied to any other attribute of consumer and or socio-economic data associated with geographic units, depending on the embodiment, or on the requirements of the requesting entity 164. Other filter criteria may be based on, for example, average credit scores per household, average number of children per household, average income per household, average liabilities per household, average number of identity theft or fraud incidents, and any other attribute described herein including socio-economic demographics, lifestyle segments, and the like. For example, a requesting entity may wish to customize an offer to enroll in a credit identity monitoring service, but only target those households in ZIP9 codes corresponding to relatively higher incidents of identity theft or fraud. Thus in this example filter criteria may be applied to remove candidate ZIP9 codes from potential rollup which have a lower average of identity theft or fraud incidents, since the corresponding households fall outside the range of the desired target demographic.

Once the initial candidate list has been filtered according to the process at block 430 (or a similar filtering process), then at block 435, the micro-geographic aggregation system 100 scores the remaining candidates, based at least in part on data associated with the candidate geographic units. Depending on the embodiment, the scoring may be performed using any type of scoring algorithm which may be preferred. In some embodiments the scoring algorithm may be selected or provided by a requesting entity 164, which may have one or more business rules or preferences for how geographic unit similarity or dissimilarity is to be evaluated, assessed, and/or scored. In general, any scoring routine which analyzes and/or evaluates the attributes associated with the candidate geographic units, optionally performs some tradeoff calculations and weighting to determine an output score for each candidate geographic unit in a consistent manner to support reliable decision making and "best score" selection may be used. Scores may be calculated in any format including a numeric score, a letter score or grade (e.g., A-F), a percentage, a range, and the like. In one embodiment, a scoring algorithm may employ a weighted sum of exponential functions that penalize (i) the distance between two candidate geographic units, (ii) a difference (or a degree of difference) in the values of the respective target variables, (iii) a difference (or a degree of difference) in the values for other descriptive variables, and (iv) a difference between the total number of households and the target or minimum number of households threshold to maintain privacy.

Continuing the example with respect to assets and MOSAIC® codes, a scoring algorithm may be executed by the micro-geographic aggregation system 100 which calculates a score for a candidate geographic unit based on desired attributes (e.g., assets and MOSAIC® code similarity, proximity, granularity, etc.) and/or tradeoffs. For example, in one embodiment, the score calculation may place more importance on factors other than distance as the distance increases (e.g., the greater the distance between geographic units, the more desirable it becomes to have a higher degree of similarity based on other attributes). In one example, a tradeoff may be implemented to sacrifice 5% of asset difference in exchange for being a certain distance (e.g., 100 meters) closer in proximity. Other examples may include: having the exact same MOSAIC® code or segment may get more weight; being in the same apartment complex may get more weight; tradeoff a certain distance in proximity in exchange for having the number of households in the candidate geographic unit reduced or increase by a certain amount in order to exactly meet a minimum household threshold; and balancing the number of candidate geographic units grouped into a single rollup in order to try and exactly meet a minimum household threshold. Exact tradeoffs implemented may vary depending on the attributes being analyzed and the end desired goal.

At block 440, the micro-geographic aggregation system 100 selects the best scoring candidate geographic unit for inclusion in a geographic unit rollup with the selected target geographic unit. Depending on the embodiment, the best scoring candidate may be a low scoring candidate (e.g., if the score is a penalty score where low scores are preferred over high scores), or a high scoring candidate, or any other variation or rule for determining which score is a "best" score. When the candidate is selected for inclusion in the rollup, the underlying attribute data associated with the geographic units in the rollup may be aggregated, combined, or averaged such that the underlying statistical variance in the data set is preserved to the greatest extent possible with respect to non-rolled up geographic units. The process 400 may then proceed to block 445.

At block 445, the micro-geographic aggregation system 100 determines whether the number of households in the rollup group is below the minimum threshold. In response to determining that the number of households in the rollup group is below the minimum threshold, the process 400 may return to block 405 and repeat block 405 to block 445 in order to continue the rollup process until the rollup group includes enough households to satisfy the minimum threshold. In response to determining that the number of households in the rollup group is greater than or equal to the minimum threshold, the process 400 may proceed to block 450.

At block 450, the micro-geographic aggregation system 100 provides the rollup group as output, for example to another process of the micro-geographic aggregation system 100 or to a requesting entity system 164. This process is similar to the process described at block 225 of process 200 shown in FIG. 2 herein.

In one embodiment, the process 400 may be executed by the micro-geographic aggregation system 100 an indeterminate number of times for a set of selected target geographic units, with each iteration of the process 400 generating a rollup group for each selected target geographic unit in the list. In one embodiment the process 400 may be executed or performed in parallel for each selected target geographic unit in the list. This may be possible in instances where the selected targets each comprise a separate, non-overlapping set of candidate geographic units which may be rolled up or aggregated with respect to each selected target.

In some embodiments, it may be possible that the set of selected target geographic units may contain zero or only one candidate geographic unit for rollup aggregation, or that a generated rollup group for a selected target geographic unit has a combined number of households less than the minimum even if all candidate geographic units associated with a selected target are included in the rollup group. Thus, the micro-geographic aggregation system 100 may be configured to account for these possible scenarios by combining or rolling up one or more selected target geographic units with each other. This combination of selected target geographic units may be performed before or after the process 400 is executed. The combination of selected target geographic units in this way may be performed using a process similar to the process 400, or by a separate process, or may even be configured manually, depending on the embodiment.

The process 400 may also be performed for a plurality of target ZIP codes for potential rollup (e.g., as received in a batch request) substantially in parallel and substantially in real time.

Sample User Interfaces

Figure 5A:
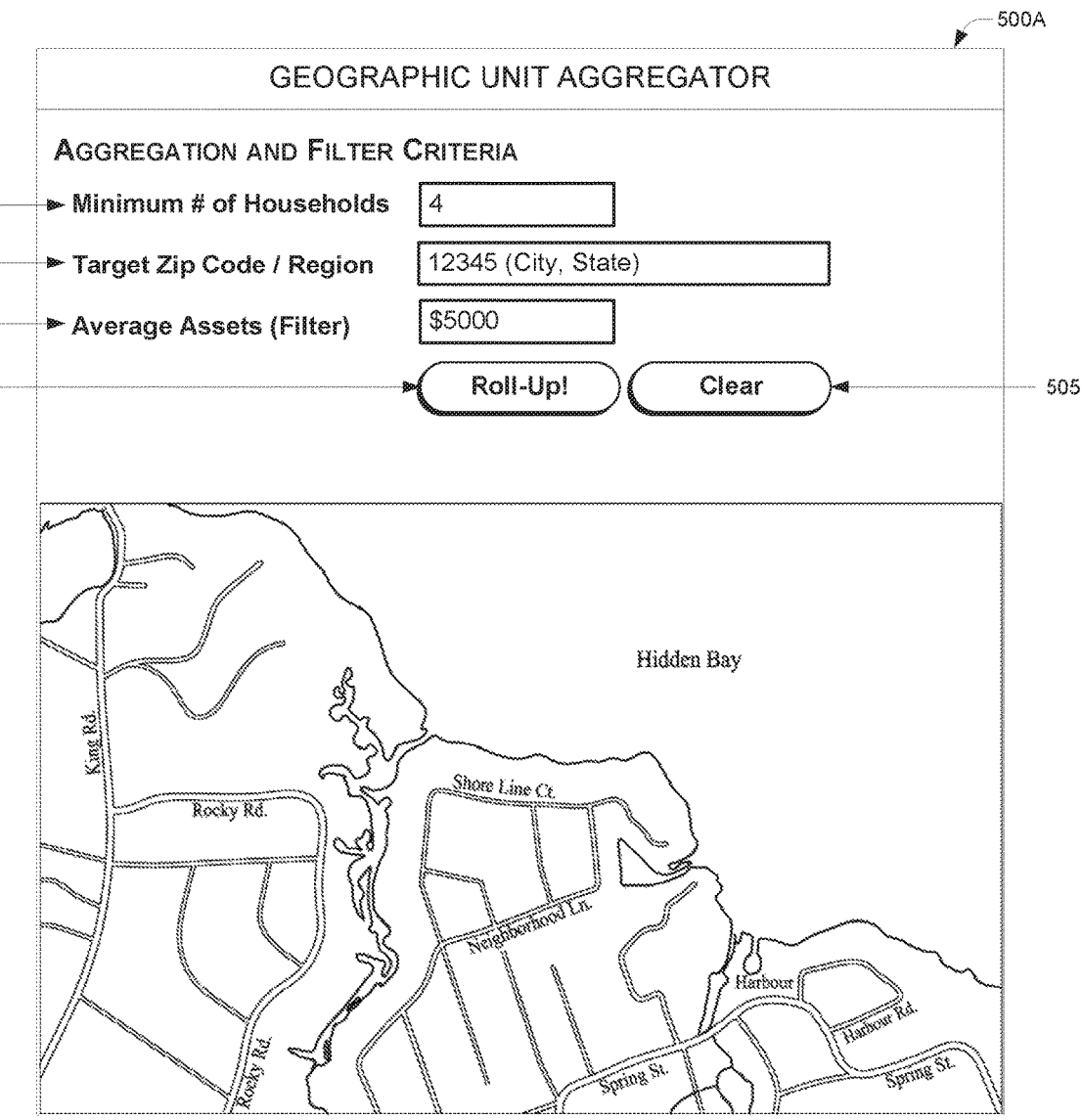
FIG. 5A illustrates an example user interface which enables an end user, such as a third party requesting entity, to submit customized rollup filters and data requests, as generated using the micro-geographic aggregation system of FIG. 8.
Figure 5B:
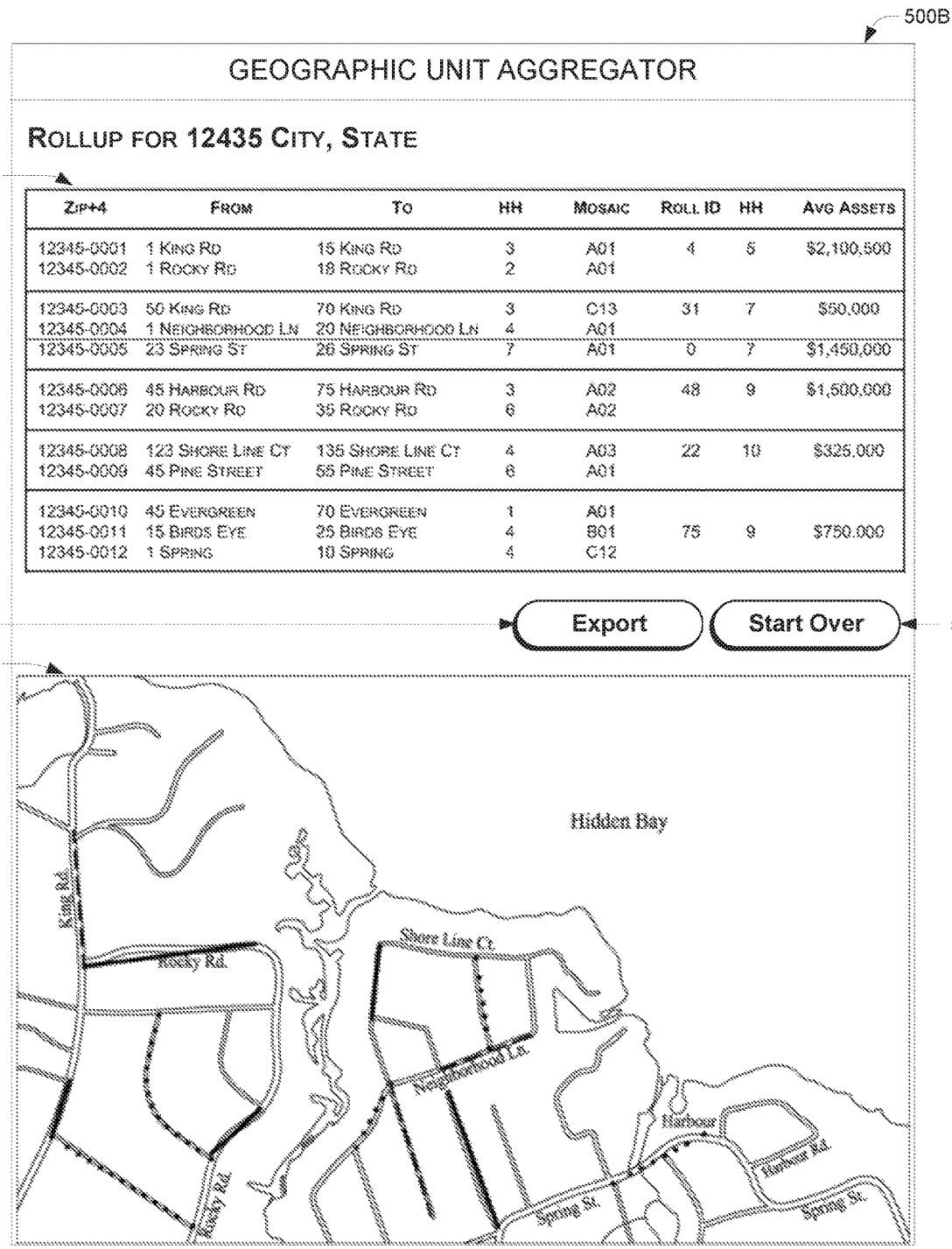
FIG. 5B illustrates an example user interface which enables an end user, such as a third party requesting entity, to view rollup maps and/or output lists generated in response to a rollup request, as using the micro-geographic aggregation system of FIG. 8.

FIGS. 5A and 5B illustrate example user interfaces ("UIs") as used in one or more embodiments of a micro-geographic aggregation system. The sample user interfaces may be displayed, for example, via a web browser or standalone application, and may be provided, for example, as a web service by the micro-geographic aggregation system 100. However, in some embodiments, the sample user interfaces shown in FIGS. 5A and 5B may also be displayed on a suitable computer device, such as a personal computer, desktop, laptop, cell/smart phone, tablet, or portable computing device, and are not limited to the samples as described herein. The user interfaces are examples of only certain features that a micro-geographic aggregation system may provide. In other embodiments, additional features may be provided and they may be provided using various different user interfaces and software code. Depending on the embodiment, the user interfaces and functionality described with reference to FIGS. 5A and 5B may be provided by software executing on a computing device, by a micro-geographic aggregation system located remotely that is in communication with the computing device via one or more networks, and/or some combination of software executing on the computing device and the micro-geographic aggregation system.

FIG. 5A illustrates an example user interface 500A which enables an end user, such as a third party requesting entity, to submit customized rollup filters and data requests, as generated in one embodiment of the micro-geographic aggregation system 100. These filters may be applied by the micro-geographic aggregation system 100 "on-the-fly" to underlying consumer-level and/or ZIP attribute data to dynamically perform custom rollups in response to the data request from the end user. As shown in FIG. 5A, the user is presented with options to specify a number of thresholds 501, a ZIP code/geographic region 502, and an average assets 503 on which to filter candidate ZIPs. The user interface 500A may additionally support candidate filtering and/or scoring criteria based on any other data attribute described herein which are not illustrated in FIG. 5A, such as socio-economic attributes, demographics, lifestyle segments, behavioral/attitudinal, credit data-related attributes, and so on. When the user is ready to request a rollup, he/she selects the rollup option 504, or the user may choose to clear 505 and start over.

In some embodiments the user may be able to enter more than one target ZIP code to be rolled up at one time (e.g. the micro-geographic aggregation system 100 may receive multiple ZIP codes for rollup aggregation in batches).

FIG. 5B illustrates an example user interface 500B which enables an end user, such as a third party requesting entity, to view rollup maps and/or output lists generated in response to a rollup request, as generated in one embodiment of the micro-geographic aggregation system 100. User interface 500B shows an output rollup grid 506 and a rollup map 509. An example of the output rollup grid 506 is illustrated and described in more detail with reference to FIG. 6 herein. The rollup map 509 may provide a visual representation of the rolled-up ZIP groups for the selected geographic region or ZIP code. The rollup groupings may be indicated for example by different colored lines, lines of different styles or thickness (e.g., dashed, dotted, bold), or any other visual representation which may be used to convey which rollup group to which each ZIP9 in the area has been assigned. The visualization can provide extra value in that the end user can quickly see how the ZIP9 codes have been grouped together, which need not always end up on adjacent ZIP9s being grouped together in the same rollup.

The user interface 500B may also provide an option for the user to export the rollup results 507, or the user may choose to start over 508 and return to the user interface 500A.

Sample Rollup Output

FIG. 6 illustrates an example geographic unit rollup output which may be provided by the rollup processes described herein. The example geographic unit rollup output may be provided, for example, to a requesting entity system 164, in different output formats including but not limited to a batch file format (e.g., a text file or a table) and/or a user interface which displays the rollup output such as the user interface 500B shown in FIG. 5B.

The example geographic unit rollup output of FIG. 6 illustrates a sample output with respect to the asset and MOSAIC® code example discussed throughout this disclosure. In particular, the table 600 includes information indicating which ZIP9 codes 601 have been grouped together, an address range (from 602 and to 603) corresponding to each ZIP9 code, a number of households 604 for each ZIP9, a MOSAIC® code 605 for each ZIP9, a roll ID 606 for the rollup group, a total number of households 607 for each rollup group, and an average assets 608 for the rollup group.

In one embodiment where the table 600 is included as part of a visual output display such as the one illustrated in FIG. 5B, rows of the table 600 may be color-coded or otherwise formatted to match the rollup groupings displayed on a map. In one example user interface, in response to the user moving a pointer or mouse (or touching a portion of the user interface for touch-screen enabled devices) over a row in the table 600, the rollup groupings displayed on the map may be highlighted to further illustrate to the end user where the ZIP codes in the rollup group are geographically on the map. Similarly rows in the table 600 may be highlighted in response to the user moving a pointer (or touching the screen) relative to ZIP code segments on the map.

Mapping Geographic Unit Data

Figure 7:
FIG. 7 illustrates an example of how different map data sources may have different and/or conflicting map latitude/longitude ("lat/long") coordinates for geographic units, such as ZIP codes, which may need to be reconciled to improve accuracy of a geographic unit rollup process.

FIG. 7 illustrates an example of how different map data sources, may have different and/or conflicting map latitude/longitude ("lat/long") coordinates for geographic units, such as ZIP codes, which may need to be reconciled for a geographic unit rollup process. For example, as shown in the map 700 of FIG. 7, for an example ZIP9 defined by a street address range with endpoints at points "B" and "E", one data source may indicate that the latitude and longitude of the center point of the line segment connecting the endpoints is at point "A", a second data source may indicate that center point corresponds to point "C", and a third data source may indicate that center point corresponds to point "D". In some embodiments, it may be beneficial to improve the accuracy of the location of the ZIP9 codes, in particular for ZIP9 codes which cover a small area or only a few households where minor differences in lat/long coordinates can make the difference as to which other ZIP9 codes would be most suitable for combination. For example, with reference to the process 400 illustrated and described in FIG. 4, finding all ZIP codes within a geographic distance or radius of a target ZIP code may require using an accurate or verified center point and/or endpoints for the target ZIP code.

One embodiment of the micro-geographic aggregation system 100 provides a process or mechanism for accessing map data from different map data sources, combining the map data and reconciling differences or discrepancies in order to generate a single, consolidated mapping of ZIP9 codes to latitude/longitude coordinates. The latitude/longitude mapping process may be performed, for example, by geographic unit mapping engine 121 of the micro-geographic aggregation system 100. The consolidated mapping of ZIP9 codes to lat/long coordinates may be stored in one of the data sources 166 and accessed by the micro-geographic aggregation system 100 for use in the rollup processes described herein, such as the processes described with reference to FIGS. 2, 3, and 4.

Latitude/longitude selection for ZIP9 map data reconciliation may be implemented a number of ways. In some embodiments, a confidence code or level may be assigned to a set of selected latitude/longitude coordinates to provide an indication of how accurate the selected latitude/longitude coordinates may be, based on the underlying source data. For example, a confidence level of 1 may be assigned if the lat/long coordinates are confirmed for a base reliable source (e.g., US Census/TIGER) relative to a secondary source. The lat/long coordinates may be confirmed if, for example, the distance between the two sources is less than a certain distance such as 0.1 mile. A confidence level of 2 may be assigned if only a base reliable source is available, but the lat/long coordinates do not agree with a secondary source. A confidence level of 3 may be assigned if more than two sources are available or have lat/long coordinates for the ZIP, but none of them are pairwise close. A confidence level of 4 may be assigned if only a base reliable source is available but no secondary source data is available to confirm the base source. A confidence level of 5 may be assigned if only secondary sources are available and/or used to approximate the lat/long coordinates for the ZIP. Additional or fewer confidence levels may be implemented depending on the different types of source data, level or confidence of accuracy, and so on. Other types of confidence scores may also be used, including letter scores, ranges, percentages, and so on.

Returning to the example illustrated in FIG. 7, according to one embodiment of the latitude/longitude mapping process implemented by the micro-geographic aggregation system 100, point C may be selected as the center point of the ZIP9 as follows. Suppose the most reliable source indicates that the center point of the ZIP9 is at point C; a secondary source indicates that the center point of the ZIP9 is point A; and an additional reliable source indicates that the center point of the ZIP9 is point D. Point A may be eliminated from consideration on the basis of being a secondary source and too far from points C and D. Point C may be selected because its source is considered more reliable, though Point D is too far away from Point C to confirm its accuracy. Thus Point C may be selected as the most accurate center point for this ZIP9 based on the available source data. Further in this example, a confidence level of 3 may be applied since all three data sources are available but none of them are within the specified threshold distance of each other.

Example System Implementation and Architecture

FIG. 8 is a block diagram of an example implementation of a micro-geographic aggregation system 100 in communication with a network 160 and various systems, such as requesting entity system(s) 164 and geographic unit/mapping data source(s) 166A consumer data source(s) 166B. The micro-geographic aggregation system 100 may be used to implement systems and methods described herein.

The micro-geographic aggregation system 100 includes, for example, a personal computer that is IBM, Macintosh, or Linux/Unix compatible or a server or workstation. In one embodiment, the micro-geographic aggregation system 100 comprises a server, a laptop computer, a smart phone, a personal digital assistant, a kiosk, or an media player, for example. In one embodiment, the exemplary micro-geographic aggregation system 100 includes one or more central processing unit ("CPU") 105, which may each include a conventional or proprietary microprocessor. The micro-geographic aggregation system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the micro-geographic aggregation system 100 are connected to the computer using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of micro-geographic aggregation system 100 may be combined into fewer components and modules or further separated into additional components and modules.

The micro-geographic aggregation system 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the micro-geographic aggregation system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary micro-geographic aggregation system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The micro-geographic aggregation system 100 may also include one or more multimedia devices 140, such as speakers, video cards, graphics accelerators, and microphones, for example.

In the embodiment of FIG. 8, the I/O devices and interfaces 110 provide a communication interface to various external devices. In the embodiment of FIG. 5, the micro-geographic aggregation system 100 is electronically coupled to a network 160, which comprises one or more of a LAN, WAN, and/or the Internet, for example, via a wired, wireless, or combination of wired and wireless, communication link 115. The network 160 communicates with various computing devices and/or other electronic devices via wired or wireless communication links.

According to FIG. 8, in some embodiments information may be provided to the micro-geographic aggregation system 100 over the network 160 from one or more geographic unit/mapping data sources 166A and/or consumer data source 166B. The geographic unit/mapping data source(s) 166A and consumer data sources 166B may include one or more internal and/or external data sources. The geographic unit/mapping data source(s) 166A may store, for example, geographic data including but not limited to census tract data, ZIP codes, ZIP5s, ZIP7s, ZIP9s, street address ranges, grid-based geographic regions corresponding to a map, and data otherwise describing or defining any other finite geographic area or location. In some embodiments, grid-based geographic regions may comprise or correspond to areas of certain population density, which may then be grouped or aggregated in a variable resolution grid. The consumer data sources 166B may store, for example, credit bureau data (for example, credit bureau data from File Ones[SM]) and/or other consumer data. Consumer data sources 166B may also store geographic level demographics that include one or more models, such as models that identify lifestyle and/or socio-economic attributes associated with a geographic location (e.g., MOSAIC® segmentation and/or codes) and/or behavioral/attitudinal/psychographic attributes associated with a geographic location (e.g., TrueTouch[SM] Touch Points segmentation). In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 8, the micro-geographic aggregation system 100 includes a geographic unit mapping engine 121, a geographic unit rollup engine 122, and a user interface module 123 that may be stored in the mass storage device 120 as executable software codes that are executed by the CPU 105. This and other modules in the micro-geographic aggregation system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 8, the micro-geographic aggregation system 100 is configured to execute the geographic unit mapping engine 121, the geographic unit rollup engine 122, and/or the user interface module 123 to perform the various methods and/or processes for geographic unit rollup, combination, and/or aggregations as described herein (such as the processes described with respect to FIGS. 2, 3, and 4 herein).

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the micro-geographic aggregation system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Other Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method of identifying one or more geographic units to combine with at least one target geographic unit for display on a graphical user interface, the method comprising:

under control of a computing device configured with specific computer- executable instructions:

receiving at least one indication associated with the at least one target geographic unit and a minimum threshold of households in an aggregated group of households;

causing display of a map within the graphical user interface, the map depicting a geographic area including the at least one target geographic unit based on the at least one indication;

identifying a plurality of candidate geographic units within a geographic distance of the at least one target geographic unit;

applying one or more filter criteria to the plurality of candidate geographic units to remove those candidate geographic units which do not satisfy the filter criteria to generate a plurality of remaining candidate geographic units;

determining, for each remaining candidate geographic unit of the plurality of remaining geographic units after application of the one or more filter criteria, a score based at least in part on similarity of household data attributes associated with each remaining candidate geographic unit and the at least one target geographic unit;

selecting a first candidate geographic unit from the plurality of remaining candidate geographic units for rollup aggregation with the at least one target geographic unit into a rollup group based on the determined scores;

aggregating the first candidate geographic unit with the target geographic unit into the rollup group; andin response to determining that a combined number of households associated with the rollup group is not below the minimum threshold, updating the map to display each of the geographic units of the rollup group, wherein the updated map includes visual indications of relative scores of each of the geographic units of the rollup group.

2. The computer-implemented method of claim 1, wherein the household data attributes include one or more socio-economic and/or lifestyle segment attributes.

3. The computer-implemented method of claim 2, wherein the socio- economic attributes include an average asset value per household within the respective geographic unit.

4. The computer-implemented method of claim 2, wherein the lifestyle segment attribute is a segment code.

5. The computer-implemented method of claim 1, wherein each candidate geographic unit is a ZIP+4 code.

6. The computer-implemented method of claim 1, wherein the one or more filter criteria further are received from a requesting entity.

7. The computer-implemented method of claim 6, wherein the one or more filter criteria are received from the requesting entity via a web user interface, and wherein the web user interface provides one or more input fields enabling the requesting entity to configure custom filter criteria for the rollup group.

8. The computer-implemented method of claim 1, wherein determining the score for each remaining candidate geographic unit further comprises:

identifying one or more target attributes on which to analyze the similarity of the household data attributes associated with each remaining candidate geographic unit to the target geographic unit;

calculating, for each remaining candidate geographic unit, a weighted similarity of the remaining candidate geographic unit to the target geographic unit based on a comparison of the target attributes; and determining the score based at least in part on the weighted similarity.

9. The computer-implemented method of claim 8, wherein the weighted similarity is calculated based at least in part on a calculated geographic distance between the remaining candidate geographic unit and the target geographic unit.

10. A computer system for identifying one or more geographic units to combine with at least one target geographic unit for display on a graphical user interface, the computer system comprising:

an electronic data store configured to at least store geographic data associated with each of a plurality of geographic units; and a computing system comprising one or more hardware computing devices, said computing system in communication with the electronic data store and configured to at least:

receive at least one indication associated with the at least one target geographic unit and a minimum threshold of households in an aggregated group of households;

cause display of a map within the graphical user interface, the map depicting a geographic area including the at least one target geographic unit based on the at least one indication;

identify a plurality of candidate geographic units within a geographic distance of the at least one target geographic unit;

apply one or more filter criteria to the plurality of candidate geographic units to remove candidate geographic units which do not satisfy the filter criteria to generate a plurality of remaining candidate geographic units;

determine, for each remaining candidate geographic unit of the plurality of remaining geographic units after application of the filter criteria, a score based at least in part on similarity of household data attributes associated with each remaining candidate geographic unit and at least one the target geographic unit;

select a first candidate geographic unit from the plurality of remaining candidate geographic units for rollup aggregation with the at least one target geographic unit into a rollup group based on the determined scores;

aggregate the first candidate geographic unit with the target geographic unit into the rollup group; and in response to determining that a combined number of households associated with the rollup group is not below a minimum threshold, update the map to display each of the geographic units of the rollup group, wherein the updated map includes visual indications of relative scores of each of the geographic units of the rollup group.

11. The computer system of claim 10, wherein each candidate geographic unit is a ZIP+4 code.

12. Non-transitory physical computer storage comprising computer-executable instructions stored thereon that, when executed by a hardware processor, are configured to perform operations to identify one or more geographic units to combine with at least one target geographic unit for display on a graphical user interface, the operations comprising:

receiving at least one indication associated with the at least one target geographic unit and a minimum threshold of households in an aggregated group of households;

causing display of a map within the graphical user interface, the map depicting a geographic area including the at least one target geographic unit based on the at least one indication;

identifying a plurality of candidate geographic units within a geographic distance of the at least one target geographic unit;

applying filter criteria to the plurality of candidate geographic units to remove candidate geographic units which do not satisfy the filter criteria to generate a plurality of remaining candidate geographic units;

determining, for each remaining candidate geographic unit of the plurality of remaining geographic units after application of the one or more filter criteria, a score based at least in part on similarity of household data attributes associated with each remaining candidate geographic unit and the at least one target geographic unit;

selecting a first candidate geographic unit from the plurality of remaining candidate geographic units for rollup aggregation with the at least one target geographic unit into a rollup group based on the determined scores;

aggregating the first candidate geographic unit with the target geographic unit into the rollup group; and responsive to determining that the combined number of households associated with the rollup group is not below a minimum threshold, updating the map to display each of the geographic units of the rollup group, wherein the updated map includes visual indications of relative scores of each of the geographic units of the rollup group.

13. The non-transitory physical computer storage of claim of claim 12, wherein the household data attributes include one or more socio-economic and/or lifestyle segment attributes.

14. The non-transitory physical computer storage of claim of claim 12, wherein each candidate geographic unit is a ZIP+4 code.

* * * * *